United States Patent
Sakagami

(10) Patent No.: US 12,271,012 B2
(45) Date of Patent: Apr. 8, 2025

(54) GLASS FOR OPTICAL FILTER AND OPTICAL FILTER

(71) Applicant: AGC Inc., Tokyo (JP)

(72) Inventor: Takahiro Sakagami, Shizuoka (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 18/902,372

(22) Filed: Sep. 30, 2024

(65) Prior Publication Data

US 2025/0028100 A1    Jan. 23, 2025

Related U.S. Application Data

(63) Continuation of application No. PCT/JP2023/011663, filed on Mar. 23, 2023.

(30) Foreign Application Priority Data

Mar. 30, 2022   (JP) .................. 2022-056647

(51) Int. Cl.
*G02B 5/20* (2006.01)
*C03C 3/17* (2006.01)
*H04N 23/55* (2023.01)

(52) U.S. Cl.
CPC .............. *G02B 5/208* (2013.01); *C03C 3/17* (2013.01); *H04N 23/55* (2023.01)

(58) Field of Classification Search
CPC ............ G02B 5/208; G02B 5/22; G02B 5/20; C03C 3/17; C03C 3/062; C03C 3/064; C03C 3/066; C03C 3/068; C03C 3/19; C03C 3/21; C03C 4/08; H04N 23/55

See application file for complete search history.

(56) References Cited

U.S. PATENT DOCUMENTS 9,445,017 B2 * 9/2016 Konishi .................. C03C 3/247
10,228,500 B2 * 3/2019 Ooi .......................... G02B 5/223
(Continued)

FOREIGN PATENT DOCUMENTS

| | | |
|---|---|---|
| JP | H11202127 A | 7/1990 |
| JP | 2005320178 A | 11/2005 |
| JP | 2006213546 A | 8/2006 |

(Continued)

OTHER PUBLICATIONS

Decision to Grant a Patent mailed on Feb. 13, 2024, issued in Japanese Patent Application No. 2024-505097, with machine-generated English Translation, total 5 pages.

(Continued)

*Primary Examiner* — Balram T Parbadia
(74) *Attorney, Agent, or Firm* — Oblon, McClelland, Maier & Neustadt, L.L.P.

(57) ABSTRACT

A glass for an optical filter, the glass being a phosphate glass including Cu, in which the glass has: an average transmittance of 80% or more at a wavelength of 430 nm to 550 nm; an average transmittance of 2% or less at a wavelength of 800 nm to 950 nm; an average transmittance of 3% or less at a wavelength of 1000 nm to 1200 nm; an average transmittance of 5% or less at a wavelength of 700 nm to 1200 nm; a transmittance of 25% or more at a wavelength of 1550 nm; and a wavelength at which a transmittance is 50% of 615 nm or more in a wavelength range of 600 nm to 800 nm.

14 Claims, 1 Drawing Sheet

(56) References Cited

U.S. PATENT DOCUMENTS

2012/0243077 A1* 9/2012 Osawa .............. H01L 27/14621
  359/356
2018/0364095 A1* 12/2018 Nagaya ................... G02B 1/04

FOREIGN PATENT DOCUMENTS

| JP | 2009-263190 A | 11/2009 |
|---|---|---|
| JP | 2009-298634 A | 12/2009 |
| JP | 2010-008908 A | 1/2010 |
| JP | 10-2012-0122785 A | 11/2012 |
| JP | 2017-165641 A | 9/2017 |
| JP | 2017-178632 A | 10/2017 |
| TW | 1743378 B | 10/2021 |

OTHER PUBLICATIONS

International Search Report mailed on May 23, 2023 in PCT/JP2023/011663, filed Mar. 23, 2023, with English translation, total 7 pages.
Written Opinion of the International Searching Authority mailed on May 23, 2023 in PCT/JP2023/011663, filed Mar. 23, 2023, total 6 pages.

* cited by examiner

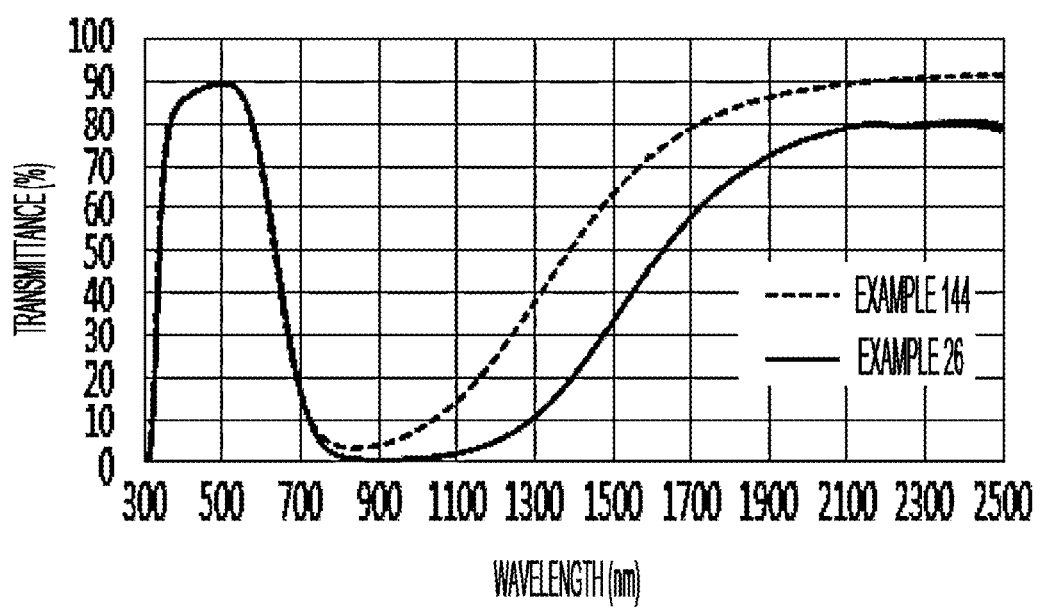

GLASS FOR OPTICAL FILTER AND OPTICAL FILTER

CROSS-REFERENCE TO RELATED APPLICATIONS

This is a bypass continuation of International Patent Application No. PCT/JP2023/011663, filed on Mar. 23, 2023, which claims priority to Japanese Patent Application No. 2022-056647, filed on Mar. 30, 2022. The contents of these applications are hereby incorporated by reference in their entireties.

TECHNICAL FIELD

The present invention relates to a glass for an optical filter and an optical filter that are used for a color correction filter of a solid-state image sensor of a digital still camera or a color video camera, or the like and particularly have an excellent transmissivity for light in a short wavelength infrared region and excellent absorption for light in a near-infrared region.

BACKGROUND ART

In recent years, with the progress of an autonomous driving technique of a vehicle, a sensing camera mounted on the vehicle has become multifunctional. For example, in addition to related-art image sensing using light in a visible light region, a sensing technique using light in a short wavelength infrared region, which is called light detection and ranging (LiDAR), is also used. Among them, a wavelength region of more than 1200 nm to 1600 nm in the short wavelength infrared region is called an eye-safe wavelength region which causes less damage to eyes, and importance of light having a wavelength of 1550 nm is particularly increasing.

Since a solid-state image sensor capable of imaging from a visible light region to an invisible light region including a short wavelength infrared region is used for the sensing camera, light sensing using visible light and short wavelength infrared light can be performed with the same sensor. On the other hand, since such a solid-state image sensor also has an absorption sensitivity in the near-infrared region, a good color reproducibility cannot be obtained in an image in the visible light region as it is.

CITATION LIST

Patent Literature

Patent Literature 1: JPH11-202127A
Patent Literature 2: JP2010-8908A

SUMMARY OF INVENTION

In an optical filter in the related art, a filter is used that shields near-infrared rays by reflecting near-infrared rays using a dielectric multilayer film on a glass that transmits visible light to short wavelength infrared light. However, in such an optical filter, the incident angle dependence of a spectral transmittance occurs, and ghost and flare that affect image quality occur, which may deteriorate sensing accuracy in a visible light region and a long wavelength infrared region. Such an optical filter is disclosed in Patent Literature 1.

A glass added with Cu (copper) that is described in Patent Literature 2 can cut near-infrared light (wavelength of 700 nm to 1200 nm) by absorption of copper ions having absorption near a wavelength of 900 nm. However, optical characteristics of the glass are focused only on a wavelength region used in a solid-state image sensor for a digital camera, and are not taken into consideration in a short wavelength infrared region (wavelength of more than 1200 nm to 1600 nm).

The present invention has been made based on such a background, and an object of the present invention is to provide a glass for an optical filter and an optical filter capable of keeping a transmittance of light in a near-infrared region low while maintaining a high transmittance of light in a short wavelength infrared region.

As a result of intensive studies, the present inventor has found that a glass for an optical filter and an optical filter capable of keeping a transmittance of light in a near-infrared region low while maintaining a high transmittance of light in a short wavelength infrared region as compared with an optical filter in the related art can be obtained by providing specific optical characteristics.

The glass for an optical filter and the optical filter of the present invention are as follows.

[1] A glass for an optical filter, the glass having a transmittance of 25% or more at a wavelength of 1550 nm and an average transmittance of 5% or less at a wavelength of 700 nm to 1200 nm.

[2] The glass for an optical filter according to the above [1], in which the glass is a phosphate glass including Cu, and the glass has an average transmittance of 80% or more at a wavelength of 430 nm to 550 nm, an average transmittance of 2% or less at a wavelength of 800 nm to 950 nm, and an average transmittance of 3% or less at a wavelength of 1000 nm to 1200 nm.

[3] The glass for an optical filter according to the above [1] or [2], in which a wavelength at which a transmittance is 50% in a wavelength range of 600 nm to 800 nm is 615 nm or more.

[4] The glass for an optical filter according to any one of the above [1] to [3], including, in terms of mass % based on oxide:
$P_2O_5$: 50% to 80%;
$Al_2O_3$: 5% to 20%;
$\Sigma R_2O$: 0.5% to 20% where $R_2O$ is one or more components selected from $Li_2O$, $Na_2O$, $K_2O$, $Rb_2O$, and $Cs_2O$, and $\Sigma R_2O$ is a total content of $R_2O$;
$\Sigma R'O$: 0% to 15% where $R'O$ is one or more components selected from CaO, MgO, BaO, SrO, and ZnO, and $\Sigma R'O$ is a total content of $R'O$; and
CuO: 4% to 20%.

[5] The glass for an optical filter according to any one of the above [1] to [4], further including more than 7% of CuO in terms of mass % based on oxide.

[6] The glass for an optical filter according to any one of the above [1] to [5], further including 60% to 75% of $P_2O_5$ in terms of mass % based on oxide.

[7] The glass for an optical filter according to any one of the above [1] to [6], further including 9% to 16.5% of $Al_2O_3$ in terms of mass % based on oxide.

[8] The glass for an optical filter according to any one of the above [1] to [7], being substantially free from BaO.

[9] The glass for an optical filter according to any one of the above [1] to [8], being substantially free from a divalent cation other than Cu.

[10] The glass for an optical filter according to any one of the above [1] to [9], further including more than 7% and 18% or less of $\Sigma R_2O$ where $R_2O$ is one or more components selected from $Li_2O$, $Na_2O$, $K_2O$, $Rb_2O$, and $Cs_2O$, and $\Sigma R_2O$ is a total content of $R_2O$.

[11] The glass for an optical filter according to any one of the above [1] to [10], further including two or more components selected from $Li_2O$, $Na_2O$, $K_2O$, $Rb_2O$, and $Cs_2O$.

[12] The glass for an optical filter according to any one of the above [1] to [11], being substantially free from $Li_2O$.

[13] The glass for an optical filter according to any one of the above [1] to [12], being substantially free from $B_2O_3$.

[14] The glass for an optical filter according to any one of the above [1] to [13], being substantially free from F.

[15] An optical filter, including the glass for an optical filter according to any one of the above [1] to [14].

According to the present invention, a glass for an optical filter and an optical filter capable of keeping a transmittance of light in a near-infrared region low while maintaining a high transmittance of light in a short wavelength infrared region can be provided.

BRIEF DESCRIPTION OF DRAWINGS

The FIGURE is a graph showing a transmittance of a light having a wavelength of 300 nm to 2500 nm in Example 26 (Inventive Example) and Example 144 (Comparative Example).

DESCRIPTION OF EMBODIMENTS

Hereinafter, modes for implementing the present invention will be described in detail. Note that the present invention is not limited to the following embodiments.

In the specification of the present application, "A to B" indicating a range means "A or more and B or less".

A glass for an optical filter (hereinafter, also simply referred to as a "glass") of an embodiment of the present invention has a transmittance of 25% or more at a wavelength of 1550 nm and an average transmittance of 5% or less at a wavelength of 700 nm to 1200 nm, as measured when light enters from a normal direction toward a main surface. When the glass of the present embodiment has such optical characteristics, a glass suitable for use as an optical filter capable of keeping a transmittance of light in a near-infrared region low while maintaining a high transmittance of light in a short wavelength infrared region can be obtained. Specifically, for example, in the case where imaging and sensing are performed using the same image sensor, a glass suitable for use as an optical filter capable of performing sensing using infrared light having a wavelength of 1550 nm while obtaining an image having a good color reproducibility in a visible light region can be obtained.

Here, the short wavelength infrared region is called an eye-safe wavelength region which causes less damage to eyes, and means a region in a wavelength of more than 1200 nm to 1600 nm in the present embodiment, and among them, a high transmittance near a wavelength of 1550 nm is particularly excellent from the viewpoint of improving sensing accuracy.

In the present embodiment, the near-infrared region means a region in a wavelength of 700 nm to 1200 nm.

In the glass of the present embodiment, the transmittance at the wavelength of 1550 nm is preferably 26% or more, more preferably 27% or more, and still more preferably 28% or more. The transmittance is generally 92% or less.

In the glass of the present embodiment, the average transmittance at the wavelength of 700 nm to 1200 nm is preferably 4% or less, more preferably 3% or less, further preferably 2% or less, and particularly preferably 1.8% or less. The average transmittance is generally 0.0001% or more.

The glass of the present embodiment is preferably a phosphate glass containing Cu, and preferably has an average transmittance of 80% or more at a wavelength of 430 nm to 550 nm, an average transmittance of 2% or less at a wavelength of 800 nm to 950 nm, and an average transmittance of 3% or less at a wavelength of 1000 nm to 1200 nm, as measured when light enters from the normal direction toward the main surface.

When the glass has such optical characteristics, for example, in the case where imaging and sensing are performed using the same image sensor, an image having a better color reproducibility in the visible light region can be obtained.

In the glass of the present embodiment, the average transmittance at the wavelength of 430 nm to 550 nm is more preferably 81% or more, further preferably 82% or more, still further preferably 83% or more, and most preferably 84% or more.

In the glass of the present embodiment, the average transmittance at the wavelength of 800 nm to 950 nm is more preferably 1.75% or less, further preferably 1.5% or less, still further preferably 1.25% or less, and most preferably 1% or less.

In the glass of the present embodiment, the average transmittance at the wavelength of 1000 nm to 1200 nm is more preferably 2.75% or less, further preferably 2.5% or less, still further preferably 2.25% or less, and most preferably 2% or less.

In the glass of the present embodiment, a wavelength (IR50) at which a transmittance is 50% in a wavelength range of 600 nm to 800 nm, as measured when light enters from the normal direction toward the main surface, is preferably 615 nm or more.

When the glass of the present embodiment has such optical characteristics, for example, in the case where imaging and sensing are performed using the same image sensor, an amount of transmitted red color exceeds a certain level, and thus an image having a better color reproducibility can be obtained.

The wavelength at which the transmittance is 50% is more preferably 617 nm or more, further preferably 619 nm or more, still further preferably 621 nm or more, and most preferably 623 nm or more. The wavelength at which the transmittance is 50% is preferably 650 nm or less, and more preferably 640 nm or less, from the viewpoint of near-infrared ray shielding.

The transmittance described above for the glass of the present embodiment is not a value converted to a transmittance in the case where the glass has a specific plate thickness. This is because the glass for an optical filter is used, for example, for a color correction filter of a solid-state image sensor, a light receiving unit of an infrared ray sensor, or the like, the transmittance from the visible light region to the infrared region is important, and the glass for an optical filter is not used with a specific plate thickness. Therefore, even when glasses have the same composition, some glasses satisfy the above transmittance and other glasses do not satisfy the above transmittance, depending on the plate thickness.

When the glass of the present embodiment is used for, for example, a color correction filter of a solid-state image sensor, the glass is generally used with a thickness of 2 mm or less. From the viewpoint of reducing the weight of the component, the thickness is preferably 1 mm or less, more preferably 0.5 mm or less, further preferably 0.3 mm or less, and still further preferably 0.2 mm or less. From the viewpoint of ensuring the strength of the glass, the thickness is preferably 0.05 mm or more.

When the glass of the present embodiment is used, for example, in a light receiving unit of an infrared ray sensor, the glass is generally used with a thickness of 3 mm or less. From the viewpoint of reducing the weight of the component, the thickness is preferably 2 mm or less, more preferably 1 mm or less, further preferably 0.5 mm or less, and still further preferably 0.3 mm or less. From the viewpoint of ensuring the strength of the glass, the thickness is preferably 0.05 mm or more.

The components that can constitute the glass of the present embodiment and preferred contents thereof (in terms of mass % based on oxide) will be described below: In the present specification, unless otherwise specified, the content of each component and the total content are expressed in terms of mass % based on oxide.

$P_2O_5$ is a main component forming the glass, and is a component for enhancing a near-infrared ray cutting property: When the content of $P_2O_5$ is 50% or more, the effect can be sufficiently obtained, and when the content of $P_2O_5$ is 80% or less, problems such as glass instability and deterioration in weather resistance are unlikely to occur. Therefore, the content of $P_2O_5$ is preferably 50% to 80%, more preferably 52% to 78%, further preferably 54% to 77%, still further preferably 56% to 76%, and most preferably 60% to 75%.

$Al_2O_3$ is a main component forming the glass, and is a component for increasing the strength of the glass. When the content of $Al_2O_3$ is 5% or more, the effect can be sufficiently obtained, and when the content of $Al_2O_3$ is 20% or less, problems such as glass instability and deterioration in near-infrared ray cutting property are unlikely to occur. Therefore, the content of $Al_2O_3$ is preferably 5% to 20%, more preferably 6% to 18%, further preferably 7% to 17%, still further preferably 8% to 17%, and most preferably 9% to 16.5%. When the content of $Al_2O_3$ is 9% or more, the weather resistance of the glass can be enhanced.

$R_2O$ (where $R_2O$ is one or more components selected from $Li_2O$, $Na_2O$, $K_2O$, $Rb_2O$. and $Cs_2O$) is a component for lowering a melting temperature of the glass, lowering a liquid phase temperature of the glass, stabilizing the glass, and the like. It is preferable that the total content of $R_2O$ ($\Sigma R_2O$) be 0.5% or more, since the effect can be sufficiently obtained, and it is preferable that $\Sigma R_2O$ be 20% or less, since the glass is less likely to become unstable. Therefore, $\Sigma R_2O$ is preferably 0.5% to 20%, more preferably 1% to 20%, further preferably 2% to 20%, still further preferably 3% to 20%, and most preferably 4% to 20%.

$Li_2O$ is a component for lowering the melting temperature of the glass, lowering the liquid phase temperature of the glass, stabilizing the glass, and the like. The content of $Li_2O$ is preferably 0% to 15%. It is preferable that the content of $Li_2O$ be 15% or less, since problems such as glass instability and deterioration in near-infrared ray cutting property are unlikely to occur. The content of $Li_2O$ is more preferably 0% to 8%, further preferably 0% to 7%, and still further preferably 0% to 6%. Most preferably, the glass is substantially free from $Li_2O$.

In the present invention, the expression "the glass or something is substantially free from a specific component" means that the component is not intentionally added, and does not exclude inclusion of the component to the extent that it is unavoidably mixed in from raw materials, or the like, and does not affect desired properties.

$Na_2O$ is a component for lowering the melting temperature of the glass, lowering the liquid phase temperature of the glass, stabilizing the glass, and the like. The content of $Na_2O$ is preferably 0% to 15%. It is preferable that the content of $Na_2O$ be 15% or less, since the glass is unlikely to become unstable. The content of $Na_2O$ is more preferably 0.5% to 14%, further preferably 1% to 13%, and still further preferably 2% to 13%.

$K_2O$ is a component having effects such as lowering the melting temperature of the glass and lowering the liquid phase temperature of the glass. The content of $K_2O$ is preferably 0% to 15%. It is preferable that the content of $K_2O$ be 15% or less, since the glass is unlikely to become unstable. The content of $K_2O$ is more preferably 0.5% to 14%, further preferably 1% to 13%, and still further preferably 2% to 13%.

$Rb_2O$ is a component having effects such as lowering the melting temperature of the glass and lowering the liquid phase temperature of the glass. The content of $Rb_2O$ is preferably 0% to 15%. It is preferable that the content of $Rb_2O$ be 15% or less, since the glass is unlikely to become unstable. The content of $Rb_2O$ is more preferably 0.5% to 14%, further preferably 1% to 13%, and still further preferably 2% to 13%.

$Cs_2O$ is a component having effects such as lowering the melting temperature of the glass and lowering the liquid phase temperature of the glass. The content of $Cs_2O$ is preferably 0% to 15%. It is preferable that the content of $Cs_2O$ be 15% or less, since the glass is unlikely to become unstable. The content of $Cs_2O$ is more preferably 0.5% to 14%, further preferably 1% to 13%, and still further preferably 2% to 13%.

When two or more of alkali metal components represented by the above $R_2O$ are added at the same time, a mixed alkali effect occurs in the glass, and a mobility of R' ions decreases. Accordingly, when the glass comes into contact with water, a hydration reaction caused by ion exchange between H' ions in water molecules and R ions in the glass is inhibited, and the weather resistance of the glass is improved. Therefore, the glass of the present embodiment preferably contains two or more components selected from $Li_2O$, $Na_2O$, $K_2O$, $Rb_2O$, and $Cs_2O$. In this case, the total content ($\Sigma R_2O$) of $R_2O$ (where $R_2O$ is $Li_2O$, $Na_2O$, $K_2O$. $Rb_2O$, and $Cs_2O$) is preferably 7% to 18% (not including 7%). It is preferable that the total content of $R_2O$ be more than 7%, since the effect can be sufficiently obtained, and it is preferable that the total content of $R_2O$ be 18% or less, since problems such as glass instability, deterioration in near-infrared ray cutting property, and deterioration in glass strength are unlikely to occur. Therefore, $\Sigma R_2O$ is preferably more than 7% and 18% or less, more preferably 7.5% to 17%, further preferably 8% to 16%, still further preferably 8.5% to 15%, and most preferably 9% to 14%.

R'O (where R'O is one or more components selected from CaO, MgO, BaO, SrO, and ZnO) is a component for lowering the melting temperature of the glass, lowering the liquid phase temperature of the glass, stabilizing the glass, increasing the glass strength, and the like. The total content of R'O ($\Sigma R'O$) is preferably 0% to 15%. It is preferable the total content of R'O be 15% or less, since problems such as glass instability, deterioration in near-infrared ray cutting property, deterioration in transmissivity for short wavelength infrared rays, and deterioration in glass strength are unlikely to occur. $\Sigma R'O$ is more preferably 0% to 13%, and further preferably 0% to 11%. $\Sigma R'O$ is still further preferably 0% to 9%, and yet still further preferably 0% to 8%.

The glass of the present embodiment preferably is substantially free from a divalent cation other than Cu. The reason for this will be described below:

When the glass of the present embodiment contains CuO, light in a near-infrared ray region is cut by light absorption of $Cu^{2+}$ ions. The light absorption is caused by electron transition between d-orbits of $Cu^{2+}$ ions split by an electric field of $O^{2-}$ ions. Splitting of the d-orbital is promoted when symmetry of the $O^{2-}$ ions existing around the $Cu^{2+}$ ions decreases. For example, when cations exist around $O^{2-}$ ions, the $O^{2-}$ ions are attracted by an electric field of the cations, and the symmetry of $O^{2-}$ ions decreases. As a result, the splitting of the d-orbital is promoted, and light absorption occurs due to electronic transition between the split d-orbitals, which weakens the light absorption ability in the near-infrared region and strengthens the light absorption ability in the short wavelength infrared region. Since the strength of the electric field of the cations becomes stronger as the ion valence increases, in particular, when an oxide containing a divalent cation other than Cu is added to the glass, the near-infrared ray cutting property may deteriorate and the transmissivity for short wavelength infrared rays may deteriorate.

CaO is a component for lowering the melting temperature of the glass, lowering the liquid phase temperature of the glass, stabilizing the glass, increasing the glass strength, and the like. The content of CaO is preferably 0% to 10%. It is preferable that the content of CaO be 10% or less, since problems such as glass instability, deterioration in near-infrared ray cutting property, and deterioration in transmissivity for short wavelength infrared rays are unlikely to occur. The content of CaO is more preferably 0% to 8%, further preferably 0% to 6%, and still further preferably 0% to 5%. Most preferably, the glass is substantially free from CaO.

MgO is a component for lowering the melting temperature of the glass, lowering the liquid phase temperature of the glass, stabilizing the glass, increasing the glass strength, and the like. The content of MgO is preferably 0% to 15%. It is preferable that the content of MgO be 15% or less, since problems such as glass instability, deterioration in near-infrared ray cutting property, and deterioration in transmissivity for short wavelength infrared rays are unlikely to occur. The content of MgO is more preferably 0% to 13%, further preferably 0% to 10%, and still further preferably 0% to 9%. Most preferably, the glass is substantially free from MgO.

BaO is a component for lowering the melting temperature of the glass, lowering the liquid phase temperature of the glass, stabilizing the glass, and the like. The content of BaO is preferably 0% to 10%. It is preferable that the content of BaO be 10% or less, since problems such as glass instability, deterioration in near-infrared ray cutting property, and deterioration in transmissivity for short wavelength infrared rays are unlikely to occur. The content of BaO is more preferably 0% to 8%, further preferably 0% to 6%, and still further preferably 0% to 5%. The content of BaO may be 0.1% or more. Most preferably, the glass is substantially free from BaO.

SrO is a component for lowering the melting temperature of the glass, lowering the liquid phase temperature of the glass, stabilizing the glass, and the like. The content of SrO is preferably 0% to 10%. It is preferable that the content of SrO be 10% or less, since problems such as glass instability, deterioration in near-infrared ray cutting property, and deterioration in transmissivity for short wavelength infrared rays are unlikely to occur. The content of SrO is more preferably 0% to 8%, and further preferably 0% to 7%. Most preferably, the glass is substantially free from SrO.

ZnO has effects such as lowering the melting temperature of the glass and lowering the liquid phase temperature of the glass. The content of ZnO is preferably 0% to 15%. It is preferable that the content of ZnO be 15% or less, since problems such as deterioration in glass solubility, deterioration in near-infrared ray cutting property, and deterioration in transmissivity for short wavelength infrared rays are unlikely to occur. The content of ZnO is more preferably 0% to 13%, further preferably 0% to 10%, and still further preferably 0% to 9%. Most preferably, the glass is substantially free from ZnO.

CuO is a component for cutting near-infrared rays. It is preferable that the content of CuO be 4% or more, since the effect can be sufficiently obtained, and it is preferable that the content of CuO be 20% or less, since problems such as deterioration in transmittance in the visible light region and deterioration in transmittance in the short wavelength infrared region are unlikely to occur. The content of CuO is more preferably 4% to 19.5%, further preferably 5% to 19%, and still further preferably 6% to 18.5%. The content of CuO is yet still further preferably more than 7%. In particular, in the case where the glass is substantially free from a divalent cation other than Cu, when the content of CuO is more than 7%, the near-infrared ray cutting property and the transmissivity for short wavelength infrared rays can be further increased. The content of CuO is most preferably 7% to 18% (not including 7%).

$B_2O_3$ may be contained in a range of 10% or less for stabilizing the glass. It is preferable that the content of $B_2O_3$ be 10% or less, since problems such as deterioration in glass weather resistance, deterioration in near-infrared ray cutting property, and deterioration in transmissivity for short wavelength infrared rays are unlikely to occur. The content of $B_2O_3$ is preferably 9% or less, more preferably 8% or less, further preferably 7% or less, and still further preferably 6% or less. Most preferably, the glass is substantially free from $B_2O_3$.

In the glass of the present embodiment, although F is an effective component for increasing the weather resistance, F is an environmentally hazardous substance and there is a risk that the near-infrared ray cutting property may be lowered, and thus it is preferable that the glass be substantially free from F.

In the glass of the present embodiment, $SiO_2$, $GeO_2$, $ZrO_2$, $SnO_2$, $TiO_2$, $CeO_2$, $WO_3$, $Y_2O_3$, $La_2O_3$, $Gd_2O_3$, $Yb_2O_3$, and $Nb_2O_5$ may be contained in a range of 5% or less in order to improve the glass weather resistance. It is preferable that the content of these components be 5% or less, since problems such as deterioration in near-infrared ray cutting property, and deterioration in transmissivity for short wavelength infrared rays are unlikely to occur. The content of these components is preferably 4% or less, more preferably 3% or less, further preferably 2% or less, and still further preferably 1% or less.

All of $Fe_2O_3$, $Cr_2O_3$, $Bi_2O_3$, NiO, $V_2O_5$, $MoO_3$, $MnO_2$, and CoO are components that lower a transmissivity for near-ultraviolet light when they are present in the glass. Therefore, when these components are excessively added, the visible transmittance in the ultraviolet region may be lowered. Therefore, it is preferable that these components not be substantially contained in the glass.

The glass of the present embodiment preferably has an average thermal expansion coefficient of $60 \times 10^{-7}/°$ C. to $180 \times 10^{-7}/°$ C. at a range of 30° C. to 300° C.

When the glass of the present embodiment is used for a color correction filter for a solid-state image sensor, the glass may be directly bonded to a packaging material since the glass also functions as a cover glass for hermetically sealing the solid-state image sensor. At this time, when a difference in thermal expansion coefficient between the glass and the packaging material is large, peeling or breakage may occur in a bonded portion, and an airtight state may not be maintained.

In general, materials such as glass, a crystallized glass, ceramics, and alumina are used as the packaging material in consideration of heat resistance, and it is preferable to reduce the difference in thermal expansion coefficient between the packaging material and the glass. Accordingly; the glass of the present embodiment preferably has a thermal expansion coefficient at a temperature range of 30° C. to 300° C. within the above range. When the thermal expansion coefficient of the glass of the present embodiment is out of the above range, the difference in thermal expansion coefficient between the glass and the packaging material is large, and the airtight state cannot be maintained due to peeling or breakage. The thermal expansion coefficient is more preferably $65 \times 10^{-7}$/° C. to $175 \times 10^{-7}$/° C., and further preferably $70 \times 10^{-7}$/° C. to $170 \times 10^{-7}$/° C.

The glass of the present embodiment can be produced, for example, as follows.

First, raw materials are weighed and mixed so as to fall within the above-described composition range (mixing step). The raw material mixture is placed in a platinum crucible, and heated and melted at a temperature of 700° C. to 1300° C. in an electric furnace (melting step). After being sufficiently stirred and clarified, the raw material mixture is cast into a mold, cut and polished to form a flat plate having a predetermined thickness (molding step).

In the melting step of the production method, the highest temperature of the glass during glass melting is preferably 1300° C. or lower. When the highest temperature of the glass during glass melting is equal to or lower than the above temperature, problems such as deterioration in transmittance characteristics and glass instability due to promotion of fluorine vaporization are unlikely to occur. The temperature is more preferably 1250° C. or lower, further preferably 1200° C. or lower, and still further preferably 1150° C. or lower.

When the temperature in the melting step is too low; problems such as devitrification occurring during melting and a long time required for burn through may occur, and thus the temperature is preferably 750° C. or higher, and more preferably 800° C. or higher.

The glass of the present embodiment may be molded into a predetermined shape, and then an optical multilayer film may be provided on or above at least one surface of the glass to obtain an optical filter including the glass for an optical filter described above. Examples of the optical multilayer film include an IR cut film (a film reflecting near-infrared rays), a UV/IR cut film (a film reflecting ultraviolet rays and near-infrared rays), a UV cut film (a film reflecting ultraviolet rays), and an antireflection film. Such an optical thin film can be formed by a known method such as a vapor deposition method or a sputtering method.

An adhesion reinforcing film may be provided between the glass of the present embodiment and the optical multilayer film. By providing the adhesion reinforcing film, the adhesion between the glass and the optical multilayer film is improved, and the film peeling can be prevented. Examples of the adhesion reinforcing film include silicon oxide ($SiO_2$), titanium oxide ($TiO_2$), lanthanum titanate ($La_2Ti_2O_7$), aluminum oxide ($Al_2O_3$), a mixture of aluminum oxide and zirconium oxide ($ZrO_2$), magnesium fluoride ($MgF_2$), calcium fluoride ($CaF_2$), strontium fluoride ($SrF_2$), and fluorine silicone. A substance containing fluorine or oxygen has higher adhesion, and magnesium fluoride and/or titanium oxide are particularly preferred as the adhesion reinforcing film since they have higher adhesion to glass or films. The adhesion reinforcing film may have a single layer or two or more layers. In the case of two or more layers, a plurality of substances may be combined.

The optical filter of the present embodiment may include, on or above at least one main surface of the glass of the present embodiment, an absorption layer containing a near-infrared ray absorbing material having a maximum absorption wavelength in a near-infrared region. With such a configuration, an optical filter that keeps a transmittance of light in the near-infrared region low can be obtained.

For the optical filter of the present embodiment, it is preferable that a near-infrared ray absorbing dye be added to a transparent resin made of one kind of resins selected from an acrylic resin, an epoxy resin, an en-thiol resin, a polycarbonate resin, a polyether resin, a polyarylate resin, a polysulfone resin, a polyethersulfone resin, a polyparaphenylene resin, a polyarylene ether phosphine oxide resin, a polyimide resin, a polyamideimide resin, a polyolefin resin, a cyclic olefin resin, and a polyester resin alone or a transparent resin obtained by two or more kinds thereof, and be contained in an absorption layer.

As the near-infrared ray absorbing dye, it is preferable to use a near-infrared ray absorbing material consisting of at least one selected from the group consisting of a squarylium dye, a phthalocyanine dye, a cyanine dye, and a diimmonium dye.

EXAMPLES

Examples will be described below, and the present invention is not limited to these Examples.

Inventive Examples and Comparative Examples of the glass for an optical filter of the present invention are shown in Tables 1 to 11. Examples 1 to 143 and Examples 146 to 156 are Inventive Examples, and Examples 144 to 145 are Comparative Examples.

[Production of Glass]

For each of the glass, raw materials were weighed and mixed so as to have a composition (mass % based on oxide) shown in Tables 1 to 11, and the mixture was put into a crucible having an inner volume of about 400 cc and melted in an air atmosphere for 2 hours. Thereafter, the mixture was clarified, stirred, and cast into a rectangular mold having a length of 100 mm, a width of 80 mm, and a height of 20 mm that was preheated to about 300° C. to 500° C., and then slowly cooled at about 1° C./min to obtain a sample glass having a plate shape. The sample glass had a length of 40 mm, a width of 30 mm, and a thickness of 0.3 mm or a length of 40 mm, a width of 30 mm, and a thickness of 0.4 mm, and both surfaces of the sample glass were optically polished.

As the raw materials of each glass, in the case of $P_2O_5$, at least one of $H_3PO_4$, $Al(PO_3)_3$, $Mg(PO_3)_2$, $Zn(PO_3)_2$, $LiPO_3$, $NaPO_3$, and $KPO_3$ was used.

In the case of $Al_2O_3$, $Al(PO_3)_3$ was used.

In the case of $Li_2O$, at least one of $LiPO_3$, $LiNO_3$, and $Li_2CO_3$ was used.

In the case of $Na_2O$, at least one of $NaPO_3$, $NaNO_3$, and $Na_2CO_3$ was used.

In the case of $K_2O$, at least one of $KPO_3$, $KNO_3$, and $K_2CO_3$ was used.

In the case of $Rb_2O$, at least one of $RbPO_3$, $RbNO_3$, and $Rb_2CO_3$ was used.

In the case of $Cs_2O$, at least one of $CsPO_3$, $CsNO_3$, and $Cs_2CO_3$ was used.

In the case of $B_2O_3$, at least one of $PBO_4$, $H_3BO_3$, and BN was used.

In the case of CaO, at least one of $Ca(PO_3)_2$, and $CaCO_3$ was used.

In the case of SrO, at least one of $SrCO_3$, $SrSO_4$, and $Sr(NO_3)_2$ was used.

In the case of MgO, at least one of MgO and $Mg(PO_3)_2$ was used.

In the case of BaO, at least one of $Ba(NO_3)_2$, $Ba(PO_3)_2$, and $BaCO_3$ was used.

In the case of ZnO, at least one of an oxide and $Zn(PO_3)_2$ was used.

In the case of $SnO_2$, at least one of an oxide and $SnSO_4$ was used.

In the case of $TiO_2$, at least one of an oxide and $TiCl_2$ was used.

In the case of $WO_3$, at least one of an oxide and $CaWO_4$ was used.

In the case of $Y_2O_3$, an oxide was used.

In the case of $La_2O_3$, an oxide was used.

In the case of $Nb_2O_5$, an oxide was used.

In the case of $CeO_2$, an oxide was used.

In the case of CuO, at least one of an oxide, $Cu(PO_3)_2$, and $CuSO_4$ was used.

In the case of $Ga_2O_3$, an oxide was used.

In the case of F, at least one of $AlF_3$, $YF_3$, $LaF_3$, $MgF_3$, $CaF_2$, $SrF_2$, $BaF_2$, LiF, NaF, KF, RbF, and CsF was used.

The raw materials of the glass are not limited to the above, and known materials can be used.

[Evaluation]

For a transmittance of the sample glass produced as described above, a transmittance at a wavelength of 300 nm to 2500 nm was measured using a spectrophotometer (V-570, manufactured by JASCO Corporation), and each of the transmittances of the glass in Examples 1 to 156 (excluding Examples 11, 13, and 22) was converted to a value in the case where the glass has a wall thickness of 0.3 mm. For the glasses in Examples 11, 13, and 22, each of the transmittances at the wavelength of 300 nm to 2500 nm was converted to a value in the case where the glass has a wall thickness of 0.4 mm. From the converted transmittances, a transmittance of a light having a wavelength of 1550 nm, an average transmittance of a light having a wavelength of 700 nm to 1200 nm, an average transmittance of a light having a wavelength of 430 nm to 550 nm, an average transmittance of a light having a wavelength of 800 nm to 950 nm, an average transmittance of a light having a wavelength of 1000 nm to 1200 nm, a transmittance of a light having a wavelength of 430 nm, and a transmittance of a light having a wavelength of 1000 nm were obtained. From the transmittances measured above, a wavelength (IR50) at which a transmittance is 50% in a near-infrared ray region was calculated.

The results are shown in Tables 1 to 11. Transmittances of a light having a wavelength of 300 nm to 2500 nm in Example 26 (Inventive Example) and Example 144 (Comparative Example) were shown in the FIGURE.

TABLE 1

| mass % | Example 1 | Example 2 | Example 3 | Example 4 | Example 5 | Example 6 | Example 7 |
|---|---|---|---|---|---|---|---|
| $P_2O_5$ | 69.42 | 67.73 | 68.18 | 71.47 | 69.30 | 67.25 | 69.31 |
| $Al_2O_3$ | 13.44 | 11.00 | 13.20 | 8.33 | 9.76 | 11.11 | 8.08 |
| $Li_2O$ | 0.00 | 0.00 | 0.00 | 0.00 | 0.00 | 0.00 | 0.00 |
| $Na_2O$ | 0.00 | 0.95 | 0.00 | 7.64 | 7.41 | 7.19 | 7.41 |
| $K_2O$ | 0.67 | 1.27 | 0.66 | 0.00 | 0.00 | 0.00 | 0.00 |
| $Rb_2O$ | 0.00 | 0.00 | 0.00 | 0.00 | 0.00 | 0.00 | 0.00 |
| $Cs_2O$ | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 1.31 |
| CaO | 0.00 | 0.00 | 0.00 | 0.00 | 0.00 | 0.00 | 0.00 |
| SrO | 0.00 | 0.00 | 1.79 | 0.00 | 0.00 | 0.00 | 1.72 |
| MgO | 0.00 | 0.00 | 0.00 | 0.00 | 0.00 | 0.00 | 0.00 |
| BaO | 2.70 | 2.54 | 2.65 | 4.57 | 4.43 | 4.30 | 4.43 |
| ZnO | 5.59 | 8.77 | 5.49 | 0.00 | 1.35 | 2.63 | 0.00 |
| $SnO_2$ | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 |
| $Nb_2O_5$ | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 |
| CuO | 8.18 | 7.72 | 8.03 | 7.99 | 7.74 | 7.51 | 7.74 |
| $Ga_2O_3$ | 0.00 | 0.00 | 0.00 | 0.00 | 0.00 | 0.00 | 0.00 |
| F | 0.00 | 0.00 | 0.00 | 0.00 | 0.00 | 0.00 | 0.00 |
| Total | 100 | 100 | 100 | 100 | 100 | 100 | 100 |
| $\Sigma R_2O$ | 0.67 | 2.23 | 0.66 | 7.64 | 7.41 | 7.19 | 7.41 |
| $\Sigma R'O$ | 8.28 | 11.32 | 9.92 | 4.57 | 5.79 | 6.93 | 6.16 |
| Transmittance [%] at 1550 nm | 41.1 | 44.9 | 38.6 | 39.0 | 41.4 | 43.2 | 40.6 |
| Average transmittance [%] at 700 nm to 1200 nm | 2.2 | 2.2 | 1.6 | 2.2 | 1.9 | 1.7 | 2.0 |
| Average transmittance [%] at 430 nm to 550 nm | 68.0 | 82.9 | 75.1 | 88.7 | 87.1 | 83.3 | 85.7 |
| Average transmittance [%] at 800 nm to 950 nm | 0.7 | 0.6 | 0.4 | 0.5 | 0.4 | 0.4 | 0.5 |

TABLE 1-continued

| | | | | | | | |
|---|---|---|---|---|---|---|---|
| Average transmittance [%] at 1000 nm to 1200 nm | 3.2 | 3.3 | 2.4 | 1.9 | 2.2 | 2.4 | 2.2 |
| Transmittance [%] at 430 nm | 52.9 | 76.7 | 64.8 | 86.5 | 84.3 | 77.9 | 81.4 |
| Transmittance [%] at 1000 nm | 1.1 | 1.0 | 0.7 | 0.6 | 0.7 | 0.7 | 0.7 |
| IR50 [nm] | 612 | 616 | 610 | 640 | 628 | 618 | 632 |

| mass % | Example 8 | Example 9 | Example 10 | Example 11 | Example 12 | Example 13 | Example 14 | Example 15 |
|---|---|---|---|---|---|---|---|---|
| $P_2O_5$ | 72.55 | 73.61 | 67.72 | 71.44 | 71.47 | 68.96 | 70.43 | 69.07 |
| $Al_2O_3$ | 8.45 | 8.58 | 10.27 | 11.21 | 8.33 | 12.92 | 8.21 | 11.41 |
| $Li_2O$ | 0.00 | 0.00 | 0.60 | 0.62 | 1.23 | 0.62 | 0.00 | 0.00 |
| $Na_2O$ | 7.76 | 7.87 | 4.28 | 1.28 | 2.55 | 1.28 | 7.53 | 7.39 |
| $K_2O$ | 0.00 | 0.00 | 1.26 | 1.29 | 3.87 | 1.29 | 0.00 | 0.00 |
| $Rb_2O$ | 0.00 | 0.00 | 0.00 | 0.00 | 0.00 | 0.00 | 0.00 | 0.00 |
| $Cs_2O$ | 0.00 | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 | 0.00 |
| CaO | 0.00 | 1.72 | 0.00 | 0.00 | 0.00 | 1.23 | 0.00 | 0.00 |
| SrO | 3.14 | 0.00 | 0.00 | 0.00 | 0.00 | 2.28 | 0.00 | 0.00 |
| MgO | 0.00 | 0.00 | 1.32 | 1.36 | 0.00 | 0.89 | 0.00 | 0.00 |
| BaO | 0.00 | 0.00 | 3.45 | 2.59 | 4.57 | 3.37 | 4.51 | 4.42 |
| ZnO | 0.00 | 0.00 | 4.68 | 4.82 | 0.00 | 1.79 | 0.00 | 0.00 |
| $SnO_2$ | 0.00 | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 |
| $Nb_2O_5$ | 0.00 | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 1.46 | 0.00 |
| CuO | 8.11 | 8.22 | 6.43 | 5.38 | 7.98 | 5.38 | 7.87 | 7.72 |
| $Ga_2O_3$ | 0.00 | 0.00 | 0.00 | 0.00 | 0.00 | 0.00 | 0.00 | 0.00 |
| F | 0.00 | 0.00 | 0.00 | 0.00 | 0.00 | 0.00 | 0.00 | 0.00 |
| Total | 100 | 100 | 100 | 100 | 100 | 100 | 100 | 100 |
| $\Sigma R_2O$ | 7.76 | 7.87 | 6.13 | 3.19 | 7.65 | 3.19 | 7.53 | 7.39 |
| $\Sigma R'O$ | 3.14 | 1.72 | 9.45 | 8.78 | 4.57 | 9.55 | 4.51 | 4.42 |
| Transmittance [%] at 1550 nm | 38.5 | 37.7 | 52.7 | 45.6 | 40.6 | 46.2 | 39.5 | 40.1 |
| Average transmittance [%] at 700 nm to 1200 nm | 2.1 | 2.0 | 3.3 | 2.3 | 2.3 | 2.4 | 2.1 | 1.8 |
| Average transmittance [%] at 430 nm to 550 nm | 88.6 | 88.3 | 86.3 | 87.9 | 89.1 | 85.7 | 87.9 | 87.6 |
| Average transmittance [%] at 800 nm to 950 nm | 0.5 | 0.5 | 1.0 | 0.6 | 0.6 | 0.6 | 0.5 | 0.4 |
| Average transmittance [%] at 1000 nm to 1200 nm | 1.9 | 1.8 | 5.0 | 3.2 | 2.1 | 3.6 | 2.0 | 2.2 |
| Transmittance [%] at 430 nm | 86.2 | 86.2 | 82.6 | 85.8 | 87.1 | 81.9 | 85.5 | 85.6 |
| Transmittance [%] at 1000 nm | 0.6 | 0.6 | 1.8 | 1.0 | 0.7 | 1.2 | 0.7 | 0.7 |
| IR50 [nm] | 640 | 638 | 626 | 622 | 642 | 618 | 636 | 624 |

TABLE 2

| mass % | Example 16 | Example 17 | Example 18 | Example 19 | Example 20 | Example 21 | Example 22 |
|---|---|---|---|---|---|---|---|
| $P_2O_5$ | 67.92 | 69.06 | 69.78 | 67.77 | 70.41 | 67.49 | 67.49 |
| $Al_2O_3$ | 12.89 | 11.41 | 11.15 | 11.20 | 11.64 | 11.57 | 11.57 |
| $Li_2O$ | 0.00 | 1.19 | 0.00 | 0.00 | 1.82 | 0.00 | 0.00 |
| $Na_2O$ | 7.26 | 2.46 | 7.22 | 3.62 | 3.76 | 3.61 | 3.61 |
| $K_2O$ | 0.00 | 3.74 | 0.00 | 5.51 | 0.00 | 5.48 | 5.48 |
| $Rb_2O$ | 0.00 | 0.00 | 0.00 | 0.00 | 0.00 | 0.00 | 0.00 |
| $Cs_2O$ | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 |
| BaO | 4.34 | 4.42 | 4.32 | 4.33 | 4.50 | 4.32 | 4.32 |
| ZnO | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 |

TABLE 2-continued

| mass % | | | | | | | |
|---|---|---|---|---|---|---|---|
| WO$_3$ | 0.00 | 0.00 | 0.00 | 0.00 | 0.00 | 0.00 | 0.00 |
| Y$_2$O$_3$ | 0.00 | 0.00 | 0.00 | 0.00 | 0.00 | 0.00 | 0.00 |
| La$_2$O$_3$ | 0.00 | 0.00 | 0.00 | 0.00 | 0.00 | 0.00 | 0.00 |
| Nb$_2$O$_5$ | 0.00 | 0.00 | 0.00 | 0.00 | 0.00 | 0.00 | 0.00 |
| CeO$_2$ | 0.00 | 0.00 | 0.00 | 0.00 | 0.00 | 0.00 | 0.00 |
| CuO | 7.59 | 7.72 | 7.54 | 7.57 | 7.87 | 7.54 | 7.54 |
| Ga$_2$O$_3$ | 0.00 | 0.00 | 0.00 | 0.00 | 0.00 | 0.00 | 0.00 |
| F | 0.00 | 0.00 | 0.00 | 0.00 | 0.00 | 0.00 | 0.00 |
| Total | 100 | 100 | 100 | 100 | 100 | 100 | 100 |
| ΣR$_2$O | 7.26 | 7.39 | 7.22 | 9.13 | 5.58 | 9.09 | 9.09 |
| ΣR'O | 4.34 | 4.42 | 4.32 | 4.33 | 4.50 | 4.32 | 4.32 |
| Transmittance [%] at 1550 nm | 40.8 | 42.1 | 46.3 | 39.0 | 43.0 | 38.8 | 29.2 |
| Average transmittance [%] at 700 nm to 1200 nm | 1.8 | 1.8 | 3.2 | 1.8 | 1.8 | 1.7 | 0.5 |
| Average transmittance [%] at 430 nm to 550 nm | 86.7 | 87.7 | 88.2 | 88.0 | 88.2 | 87.1 | 85.8 |
| Average transmittance [%] at 800 nm to 950 nm | 0.4 | 0.4 | 1.0 | 0.4 | 0.4 | 0.4 | 0.1 |
| Average transmittance [%] at 1000 nm to 1200 nm | 2.4 | 2.3 | 4.0 | 2.0 | 2.5 | 1.9 | 0.6 |
| Transmittance [%] at 430 nm | 84.4 | 85.9 | 86.4 | 86.1 | 86.6 | 84.8 | 82.8 |
| Transmittance [%] at 1000 nm | 0.7 | 0.7 | 1.5 | 0.6 | 0.7 | 0.6 | 0.1 |
| IR50 [nm] | 620 | 622 | 632 | 628 | 622 | 624 | 612 |

| mass % | Example 23 | Example 24 | Example 25 | Example 26 | Example 27 | Example 28 | Example 29 | Example 30 |
|---|---|---|---|---|---|---|---|---|
| P$_2$O$_5$ | 64.28 | 65.98 | 63.15 | 67.59 | 65.01 | 65.38 | 64.08 | 67.16 |
| Al$_2$O$_3$ | 10.62 | 10.90 | 10.44 | 11.17 | 10.74 | 10.80 | 10.59 | 11.10 |
| Li$_2$O | 0.00 | 0.00 | 0.00 | 0.00 | 0.00 | 0.00 | 0.00 | 0.00 |
| Na$_2$O | 3.44 | 3.53 | 0.00 | 3.11 | 2.32 | 1.75 | 3.43 | 3.09 |
| K$_2$O | 0.00 | 2.68 | 5.13 | 6.26 | 3.52 | 5.31 | 0.00 | 6.22 |
| Rb$_2$O | 10.37 | 5.32 | 10.18 | 0.00 | 6.99 | 5.27 | 10.33 | 0.00 |
| Cs$_2$O | 0.00 | 0.00 | 0.00 | 0.00 | 0.00 | 0.00 | 0.00 | 0.00 |
| B$_2$O$_3$ | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 |
| BaO | 4.11 | 4.22 | 4.04 | 4.32 | 4.16 | 4.18 | 4.10 | 4.30 |
| ZnO | 0.00 | 0.00 | 0.00 | 0.00 | 0.00 | 0.00 | 0.31 | 0.00 |
| SnO$_2$ | 0.00 | 0.00 | 0.00 | 0.00 | 0.00 | 0.00 | 0.00 | 0.00 |
| TiO$_2$ | 0.00 | 0.00 | 0.00 | 0.00 | 0.00 | 0.00 | 0.00 | 0.00 |
| WO$_3$ | 0.00 | 0.00 | 0.00 | 0.00 | 0.00 | 0.00 | 0.00 | 0.00 |
| Y$_2$O$_3$ | 0.00 | 0.00 | 0.00 | 0.00 | 0.00 | 0.00 | 0.00 | 0.00 |
| La$_2$O$_3$ | 0.00 | 0.00 | 0.00 | 0.00 | 0.00 | 0.00 | 0.00 | 0.00 |
| Nb$_2$O$_5$ | 0.00 | 0.00 | 0.00 | 0.00 | 0.00 | 0.00 | 0.00 | 0.00 |
| CeO$_2$ | 0.00 | 0.00 | 0.00 | 0.00 | 0.00 | 0.00 | 0.00 | 0.00 |
| CuO | 7.18 | 7.37 | 7.06 | 7.55 | 7.26 | 7.30 | 7.16 | 8.14 |
| Ga$_2$O$_3$ | 0.00 | 0.00 | 0.00 | 0.00 | 0.00 | 0.00 | 0.00 | 0.00 |
| F | 0.00 | 0.00 | 0.00 | 0.00 | 0.00 | 0.00 | 0.00 | 0.00 |
| Total | 100 | 100 | 100 | 100 | 100 | 100 | 100 | 100 |
| ΣR$_2$O | 13.80 | 11.53 | 15.32 | 9.37 | 12.83 | 12.33 | 13.76 | 9.31 |
| ΣR'O | 4.11 | 4.22 | 4.04 | 4.32 | 4.16 | 4.18 | 4.41 | 4.30 |
| Transmittance [%] at 1550 nm | 39.4 | 39.7 | 36.2 | 36.4 | 37.6 | 37.8 | 38.8 | 33.5 |
| Average transmittance [%] at 700 nm to 1200 nm | 2.1 | 2.0 | 1.7 | 1.8 | 1.7 | 1.8 | 1.9 | 0.9 |
| Average transmittance [%] at 430 nm to 550 nm | 88.6 | 88.1 | 88.6 | 88.6 | 87.3 | 88.1 | 87.4 | 86.0 |
| Average transmittance [%] at 800 nm to 950 nm | 0.5 | 0.5 | 0.4 | 0.4 | 0.4 | 0.4 | 0.5 | 0.2 |
| Average transmittance [%] at 1000 nm to 1200 nm | 2.1 | 2.1 | 1.6 | 1.6 | 1.7 | 1.8 | 2.0 | 1.0 |
| Transmittance [%] at 430 nm | 86.9 | 86.2 | 87.0 | 87.2 | 85.2 | 86.1 | 85.1 | 83.0 |

TABLE 2-continued

| Transmittance [%] at 1000 nm | 0.7 | 0.7 | 0.5 | 0.5 | 0.5 | 0.6 | 0.6 | 0.3 |
|---|---|---|---|---|---|---|---|---|
| IR50 [nm] | 632 | 630 | 630 | 632 | 628 | 630 | 628 | 618 |

TABLE 3

| mass % | Example 31 | Example 32 | Example 33 | Example 34 | Example 35 | Example 36 | Example 37 |
|---|---|---|---|---|---|---|---|
| $P_2O_5$ | 66.73 | 67.33 | 66.90 | 66.56 | 66.31 | 66.10 | 66.48 |
| $Al_2O_3$ | 11.03 | 11.13 | 11.06 | 11.00 | 10.96 | 10.92 | 10.99 |
| $Li_2O$ | 0.00 | 0.00 | 0.00 | 0.00 | 0.00 | 0.00 | 0.00 |
| $Na_2O$ | 3.07 | 3.60 | 3.58 | 2.57 | 3.05 | 3.04 | 3.55 |
| $K_2O$ | 6.18 | 5.47 | 5.4 | 6.91 | 6.14 | 6.12 | 5.40 |
| $Rb_2O$ | 0.00 | 0.00 | 0.00 | 0.00 | 0.00 | 0.00 | 0.00 |
| $Cs_2O$ | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 |
| BaO | 4.27 | 4.31 | 4.28 | 4.26 | 4.24 | 4.23 | 4.25 |
| ZnO | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 |
| $Nb_2O_5$ | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 |
| CuO | 8.73 | 8.17 | 8.75 | 8.71 | 9.31 | 9.59 | 9.33 |
| $Ga_2O_3$ | 0.00 | 0.00 | 0.00 | 0.00 | 0.00 | 0.00 | 0.00 |
| F | 0.00 | 0.00 | 0.00 | 0.00 | 0.00 | 0.00 | 0.00 |
| Total | 100 | 100 | 100 | 100 | 100 | 100 | 100 |
| $\Sigma R_2O$ | 9.25 | 9.07 | 9.01 | 9.48 | 9.19 | 9.16 | 8.96 |
| $\Sigma R'O$ | 4.27 | 4.31 | 4.28 | 4.26 | 4.24 | 4.23 | 4.25 |
| Transmittance [%] at 1550 nm | 36.0 | 34.9 | 33.5 | 34.1 | 30.5 | 30.3 | 31.1 |
| Average transmittance [%] at 700 nm to 1200 nm | 1.3 | 1.1 | 0.9 | 1.0 | 0.6 | 0.6 | 0.6 |
| Average transmittance [%] at 430 nm to 550 nm | 87.4 | 86.3 | 85.6 | 86.7 | 84.9 | 84.7 | 84.9 |
| Average transmittance [%] at 800 nm to 950 nm | 0.3 | 0.2 | 0.1 | 0.2 | 0.1 | 0.1 | 0.1 |
| Average transmittance [%] at 1000 nm to 1200 nm | 1.4 | 1.2 | 1.0 | 1.1 | 0.7 | 0.7 | 0.7 |
| Transmittance [%] at 430 nm | 85.1 | 83.8 | 82.5 | 84.3 | 81.4 | 80.8 | 81.1 |
| Transmittance [%] at 1000 nm | 0.4 | 0.3 | 0.2 | 0.3 | 0.1 | 0.1 | 0.2 |
| IR50 [nm] | 624 | 620 | 616 | 618 | 612 | 612 | 612 |

| mass % | Example 38 | Example 39 | Example 40 | Example 41 | Example 42 | Example 43 | Example 44 | Example 45 |
|---|---|---|---|---|---|---|---|---|
| $P_2O_5$ | 66.27 | 66.52 | 67.00 | 67.28 | 66.68 | 67.05 | 67.41 | 66.96 |
| $Al_2O_3$ | 10.95 | 10.99 | 10.66 | 10.29 | 10.83 | 10.71 | 10.60 | 11.06 |
| $Li_2O$ | 0.00 | 0.00 | 0.00 | 0.00 | 0.00 | 0.00 | 0.00 | 0.00 |
| $Na_2O$ | 3.54 | 3.06 | 3.08 | 3.10 | 3.02 | 2.98 | 2.95 | 3.08 |
| $K_2O$ | 5.38 | 6.16 | 6.20 | 6.23 | 6.07 | 6.00 | 5.94 | 6.20 |
| $Rb_2O$ | 0.00 | 0.00 | 0.00 | 0.00 | 0.00 | 0.00 | 0.00 | 0.00 |
| $Cs_2O$ | 0.00 | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 |
| BaO | 4.24 | 4.25 | 4.29 | 4.30 | 4.19 | 4.15 | 4.10 | 4.28 |
| ZnO | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.93 |
| $Y_2O_3$ | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 |
| $Nb_2O_5$ | 0.00 | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 | 0.00 |

TABLE 3-continued

|  |  |  |  |  |  |  |  |  |
|---|---|---|---|---|---|---|---|---|
| CuO | 9.62 | 9.02 | 8.77 | 8.80 | 9.20 | 9.10 | 9.00 | 7.48 |
| $Ga_2O_3$ | 0.00 | 0.00 | 0.00 | 0.00 | 0.00 | 0.00 | 0.00 | 0.00 |
| F | 0.00 | 0.00 | 0.00 | 0.00 | 0.00 | 0.00 | 0.00 | 0.00 |
| Total | 100 | 100 | 100 | 100 | 100 | 100 | 100 | 100 |
| $\Sigma R_2O$ | 8.93 | 9.22 | 9.29 | 9.32 | 9.09 | 8.99 | 8.89 | 9.28 |
| $\Sigma R'O$ | 4.24 | 4.25 | 4.29 | 4.30 | 4.19 | 4.15 | 4.10 | 4.28 |
| Transmittance [%] at 1550 nm | 30.2 | 31.5 | 34.2 | 34.1 | 31.0 | 31.0 | 31.7 | 39.1 |
| Average transmittance [%] at 700 nm to 1200 nm | 0.6 | 0.7 | 1.0 | 1.1 | 0.7 | 0.7 | 0.8 | 1.8 |
| Average transmittance [%] at 430 nm to 550 nm | 84.3 | 84.6 | 86.3 | 86.7 | 84.2 | 85.6 | 85.9 | 85.7 |
| Average transmittance [%] at 800 nm to 950 nm | 0.1 | 0.1 | 0.2 | 0.2 | 0.1 | 0.1 | 0.1 | 0.4 |
| Average transmittance [%] at 1000 nm to 1200 nm | 0.7 | 0.8 | 1.1 | 1.1 | 0.8 | 0.7 | 0.8 | 2.0 |
| Transmittance [%] at 430 nm | 80.3 | 81.0 | 83.4 | 83.8 | 80.2 | 82.2 | 82.8 | 82.1 |
| Transmittance [%] at 1000 nm | 0.1 | 0.2 | 0.3 | 0.3 | 0.2 | 0.2 | 0.2 | 0.6 |
| IR50 [nm] | 610 | 614 | 620 | 622 | 614 | 616 | 618 | 626 |

TABLE 4

|  | Example 46 | Example 47 | Example 48 | Example 49 | Example 50 | Example 51 | Example 52 |
|---|---|---|---|---|---|---|---|
| $P_2O_5$ | 66.34 | 66.98 | 66.37 | 66.71 | 65.85 | 66.92 | 66.26 |
| $Al_2O_3$ | 10.96 | 11.07 | 10.97 | 11.02 | 10.88 | 10.24 | 9.33 |
| $Li_2O$ | 0.00 | 0.00 | 0.00 | 0.00 | 0.00 | 0.00 | 0.00 |
| $Na_2O$ | 3.05 | 3.08 | 3.05 | 3.07 | 3.03 | 3.08 | 3.05 |
| $K_2O$ | 6.14 | 6.20 | 6.14 | 6.18 | 6.10 | 6.19 | 6.13 |
| $Rb_2O$ | 0.00 | 0.00 | 0.00 | 0.00 | 0.00 | 0.00 | 0.00 |
| $Cs_2O$ | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 |
| BaO | 4.24 | 4.28 | 4.25 | 4.27 | 4.21 | 4.28 | 4.24 |
| ZnO | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 |
| $WO_3$ | 1.85 | 0.00 | 0.00 | 0.00 | 0.00 | 0.00 | 0.00 |
| $Y_2O_3$ | 0.00 | 0.91 | 1.80 | 0.00 | 0.00 | 1.81 | 3.59 |
| $La_2O_3$ | 0.00 | 0.00 | 0.00 | 1.30 | 2.58 | 0.00 | 0.00 |
| $Nb_2O_5$ | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 |
| CuO | 7.41 | 7.48 | 7.42 | 7.45 | 7.36 | 7.48 | 7.40 |
| $Ga_2O_3$ | 0.00 | 0.00 | 0.00 | 0.00 | 0.00 | 0.00 | 0.00 |
| F | 0.00 | 0.00 | 0.00 | 0.00 | 0.00 | 0.00 | 0.00 |
| Total | 100 | 100 | 100 | 100 | 100 | 100 | 100 |
| $\Sigma R_2O$ | 9.19 | 9.28 | 9.20 | 9.25 | 9.13 | 9.27 | 9.18 |
| $\Sigma R'O$ | 4.24 | 4.28 | 4.25 | 4.27 | 4.21 | 4.28 | 4.24 |
| Transmittance [%] at 1550 nm | 37.9 | 38.7 | 39.5 | 38.8 | 38.6 | 38.7 | 43.2 |
| Average transmittance [%] at 700 nm to 1200 nm | 1.6 | 1.7 | 1.7 | 1.6 | 1.6 | 1.7 | 2.5 |
| Average transmittance [%] at 430 nm to 550 nm | 82.6 | 88.3 | 87.0 | 87.2 | 86.4 | 87.4 | 87.9 |
| Average transmittance [%] at 800 nm to 950 nm | 0.4 | 0.4 | 0.4 | 0.4 | 0.3 | 0.4 | 0.7 |
| Average transmittance [%] at 1000 nm to 1200 nm | 1.8 | 1.9 | 2.0 | 1.9 | 1.9 | 1.9 | 3.0 |
| Transmittance [%] at 430 nm | 76.8 | 86.2 | 84.6 | 84.8 | 84.0 | 85.2 | 85.8 |

TABLE 4-continued

| | | | | | | | | |
|---|---|---|---|---|---|---|---|---|
| Transmittance [%] at 1000 nm | 0.5 | 0.6 | 0.6 | 0.6 | 0.6 | 0.6 | 1.1 | |
| IR50 [nm] | 624 | 626 | 622 | 624 | 620 | 626 | 630 | |

| | Example 53 | Example 54 | Example 55 | Example 56 | Example 57 | Example 58 | Example 59 | Example 60 |
|---|---|---|---|---|---|---|---|---|
| $P_2O_5$ | 66.87 | 66.16 | 67.18 | 66.77 | 66.95 | 67.59 | 67.59 | 67.59 |
| $Al_2O_3$ | 11.05 | 10.93 | 11.10 | 11.03 | 11.06 | 11.17 | 11.17 | 11.17 |
| $Li_2O$ | 0.00 | 0.00 | 0.00 | 0.00 | 0.00 | 0.00 | 0.00 | 0.00 |
| $Na_2O$ | 3.08 | 3.05 | 3.09 | 3.07 | 3.08 | 3.11 | 3.11 | 3.11 |
| $K_2O$ | 6.19 | 6.12 | 6.22 | 6.18 | 4.68 | 6.26 | 6.26 | 6.26 |
| $Rb_2O$ | 0.00 | 0.00 | 0.00 | 0.00 | 0.00 | 0.00 | 0.00 | 0.00 |
| $Cs_2O$ | 0.00 | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 |
| BaO | 4.28 | 4.23 | 4.30 | 4.27 | 6.75 | 4.32 | 4.32 | 4.32 |
| ZnO | 0.00 | 0.00 | 0.00 | 0.00 | 0.00 | 0.00 | 0.00 | 0.00 |
| $SnO_2$ | 0.00 | 0.00 | 0.61 | 1.21 | 0.00 | 0.00 | 0.00 | 0.00 |
| $TiO_2$ | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 |
| $Nb_2O_5$ | 1.07 | 2.11 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 | 0.00 |
| CuO | 7.47 | 7.39 | 7.51 | 7.46 | 7.48 | 7.55 | 7.55 | 7.55 |
| $Ga_2O_3$ | 0.00 | 0.00 | 0.00 | 0.00 | 0.00 | 0.00 | 0.00 | 0.00 |
| F | 0.00 | 0.00 | 0.00 | 0.00 | 0.00 | 0.00 | 0.00 | 0.00 |
| Total | 100 | 100 | 100 | 100 | 100 | 100 | 100 | 100 |
| $\Sigma R_2O$ | 9.27 | 9.17 | 9.31 | 9.25 | 7.76 | 9.37 | 9.37 | 9.37 |
| $\Sigma R'O$ | 4.28 | 4.23 | 4.30 | 4.27 | 6.75 | 4.32 | 4.32 | 4.32 |
| Transmittance [%] at 1550 nm | 38.6 | 38.2 | 38.6 | 39.2 | 39.0 | 39.3 | 39.6 | 39.4 |
| Average transmittance [%] at 700 nm to 1200 nm | 1.7 | 1.7 | 1.8 | 1.9 | 1.7 | 1.9 | 1.9 | 1.9 |
| Average transmittance [%] at 430 nm to 550 nm | 86.3 | 85.4 | 87.4 | 87.5 | 87.2 | 87.8 | 88.2 | 87.8 |
| Average transmittance [%] at 800 nm to 950 nm | 0.4 | 0.4 | 0.4 | 0.5 | 0.4 | 0.5 | 0.5 | 0.5 |
| Average transmittance [%] at 1000 nm to 1200 nm | 1.9 | 1.9 | 1.9 | 2.1 | 2.0 | 2.0 | 2.1 | 2.1 |
| Transmittance [%] at 430 nm | 83.0 | 81.1 | 85.3 | 85.4 | 85.0 | 86.0 | 86.2 | 85.8 |
| Transmittance [%] at 1000 nm | 0.6 | 0.6 | 0.6 | 0.7 | 0.6 | 0.7 | 0.7 | 0.7 |
| IR50 [nm] | 626 | 624 | 628 | 628 | 626 | 628 | 628 | 628 |

TABLE 5

| | Example 61 | Example 62 | Example 63 | Example 64 | Example 65 | Example 66 | Example 67 |
|---|---|---|---|---|---|---|---|
| $P_2O_5$ | 67.59 | 66.63 | 66.32 | 67.91 | 68.24 | 68.09 | 68.61 |
| $Al_2O_3$ | 11.17 | 11.01 | 10.96 | 11.22 | 11.28 | 11.25 | 11.34 |
| $Li_2O$ | 0.00 | 0.00 | 0.00 | 0.00 | 0.00 | 0.00 | 0.00 |
| $Na_2O$ | 3.11 | 3.07 | 3.05 | 3.13 | 3.14 | 3.64 | 4.18 |
| $K_2O$ | 6.26 | 3.91 | 3.14 | 7.06 | 7.86 | 6.30 | 6.35 |
| $Rb_2O$ | 0.00 | 0.00 | 0.00 | 0.00 | 0.00 | 0.00 | 0.00 |
| $Cs_2O$ | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 |
| BaO | 4.32 | 7.94 | 9.13 | 3.09 | 1.85 | 3.10 | 1.86 |
| ZnO | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 |
| $Nb_2O_5$ | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 |

TABLE 5-continued

|  |  |  |  |  |  |  |  |
|---|---|---|---|---|---|---|---|
| CuO | 7.55 | 7.44 | 7.41 | 7.59 | 7.62 | 7.61 | 7.66 |
| $Ga_2O_3$ | 0.00 | 0.00 | 0.00 | 0.00 | 0.00 | 0.00 | 0.00 |
| F | 0.00 | 0.00 | 0.00 | 0.00 | 0.00 | 0.00 | 0.00 |
| Total | 100 | 100 | 100 | 100 | 100 | 100 | 100 |
| $\Sigma R_2O$ | 9.37 | 6.97 | 6.19 | 10.18 | 11.00 | 9.94 | 10.53 |
| $\Sigma R'O$ | 4.32 | 7.94 | 9.13 | 3.09 | 1.85 | 3.10 | 1.86 |
| Transmittance [%] at 1550 nm | 39.0 | 38.2 | 39.7 | 38.1 | 37.8 | 38.8 | 38.5 |
| Average transmittance [%] at 700 nm to 1200 nm | 1.8 | 1.6 | 1.8 | 1.7 | 1.7 | 1.8 | 1.7 |
| Average transmittance [%] at 430 nm to 550 nm | 86.8 | 86.7 | 87.4 | 88.0 | 87.7 | 87.6 | 87.4 |
| Average transmittance [%] at 800 nm to 950 nm | 0.4 | 0.4 | 0.4 | 0.4 | 0.4 | 0.4 | 0.4 |
| Average transmittance [%] at 1000 nm to 1200 nm | 2.0 | 1.9 | 2.2 | 1.8 | 1.7 | 1.9 | 1.8 |
| Transmittance [%] at 430 nm | 84.3 | 84.5 | 85.2 | 86.1 | 85.6 | 85.5 | 85.2 |
| Transmittance [%] at 1000 nm | 0.6 | 0.6 | 0.7 | 0.6 | 0.5 | 0.6 | 0.6 |
| IR50 [nm] | 626 | 624 | 626 | 628 | 628 | 628 | 628 |

|  | Example 68 | Example 69 | Example 70 | Example 71 | Example 72 | Example 73 | Example 74 | Example 75 |
|---|---|---|---|---|---|---|---|---|
| $P_2O_5$ | 68.76 | 68.58 | 68.94 | 69.13 | 68.47 | 68.18 | 69.01 | 68.73 |
| $Al_2O_3$ | 11.36 | 11.33 | 11.39 | 11.42 | 11.73 | 12.10 | 11.40 | 11.36 |
| $Li_2O$ | 0.00 | 0.00 | 0.00 | 0.00 | 0.00 | 0.00 | 0.00 | 0.00 |
| $Na_2O$ | 3.68 | 3.16 | 4.20 | 4.72 | 3.66 | 3.65 | 3.93 | 3.16 |
| $K_2O$ | 7.92 | 8.67 | 7.16 | 6.40 | 7.89 | 7.85 | 7.95 | 9.06 |
| $Rb_2O$ | 0.00 | 0.00 | 0.00 | 0.00 | 0.00 | 0.00 | 0.00 | 0.00 |
| $Cs_2O$ | 0.00 | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 |
| BaO | 0.60 | 0.60 | 0.60 | 0.60 | 0.60 | 0.60 | 0.00 | 0.00 |
| ZnO | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 |
| $Nb_2O_5$ | 0.00 | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 | 0.00 |
| CuO | 7.68 | 7.66 | 7.70 | 7.72 | 7.65 | 7.62 | 7.71 | 7.68 |
| $Ga_2O_3$ | 0.00 | 0.00 | 0.00 | 0.00 | 0.00 | 0.00 | 0.00 | 0.00 |
| F | 0.00 | 0.00 | 0.00 | 0.00 | 0.00 | 0.00 | 0.00 | 0.00 |
| Total | 100 | 100 | 100 | 100 | 100 | 100 | 100 | 100 |
| $\Sigma R_2O$ | 11.60 | 11.83 | 11.36 | 11.12 | 11.55 | 11.50 | 11.88 | 12.23 |
| $\Sigma R'O$ | 0.60 | 0.60 | 0.60 | 0.60 | 0.60 | 0.60 | 0.00 | 0.00 |
| Transmittance [%] at 1550 nm | 37.3 | 37.1 | 38.9 | 39.4 | 37.6 | 38.1 | 37.7 | 37.1 |
| Average transmittance [%] at 700 nm to 1200 nm | 1.6 | 1.6 | 1.8 | 1.8 | 1.6 | 1.6 | 1.6 | 1.6 |
| Average transmittance [%] at 430 nm to 550 nm | 87.7 | 88.4 | 87.9 | 88.2 | 87.4 | 87.9 | 88.1 | 88.3 |
| Average transmittance [%] at 800 nm to 950 nm | 0.3 | 0.3 | 0.4 | 0.4 | 0.3 | 0.4 | 0.4 | 0.3 |
| Average transmittance [%] at 1000 nm to 1200 nm | 1.6 | 1.6 | 1.9 | 1.9 | 1.7 | 1.8 | 1.6 | 1.5 |
| Transmittance [%] at 430 nm | 85.6 | 86.4 | 85.9 | 86.1 | 85.3 | 85.8 | 86.2 | 86.4 |
| Transmittance [%] at 1000 nm | 0.5 | 0.5 | 0.6 | 0.6 | 0.5 | 0.5 | 0.5 | 0.5 |
| IR50 [nm] | 628 | 630 | 630 | 630 | 626 | 626 | 630 | 630 |

TABLE 6

|  | Example 76 | Example 77 | Example 78 | Example 79 | Example 80 | Example 81 | Example 82 |
|---|---|---|---|---|---|---|---|
| $P_2O_5$ | 69.10 | 69.38 | 68.43 | 69.75 | 68.64 | 68.55 | 68.46 |
| $Al_2O_3$ | 11.42 | 11.46 | 11.31 | 11.53 | 11.34 | 11.33 | 11.31 |
| $Li_2O$ | 0.00 | 0.00 | 0.00 | 0.00 | 0.00 | 0.00 | 0.00 |
| $Na_2O$ | 4.21 | 4.99 | 3.67 | 6.05 | 2.90 | 2.64 | 2.39 |
| $K_2O$ | 7.55 | 6.42 | 7.09 | 4.88 | 9.44 | 9.82 | 10.19 |
| $Rb_2O$ | 0.00 | 0.00 | 0.00 | 0.00 | 0.00 | 0.00 | 0.00 |
| $Cs_2O$ | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 |
| BaO | 0.00 | 0.00 | 1.86 | 0.00 | 0.00 | 0.00 | 0.00 |
| ZnO | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 |
| $Nb_2O_5$ | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 |
| CuO | 7.72 | 7.75 | 7.65 | 7.79 | 7.67 | 7.66 | 7.65 |
| $Ga_2O_3$ | 0.00 | 0.00 | 0.00 | 0.00 | 0.00 | 0.00 | 0.00 |
| F | 0.00 | 0.00 | 0.00 | 0.00 | 0.00 | 0.00 | 0.00 |
| Total | 100 | 100 | 100 | 100 | 100 | 100 | 100 |
| $\Sigma R_2O$ | 11.76 | 11.41 | 10.76 | 10.93 | 12.34 | 12.46 | 12.58 |
| $\Sigma R'O$ | 0.00 | 0.00 | 1.86 | 0.00 | 0.00 | 0.00 | 0.00 |
| Transmittance [%] at 1550 nm | 39.2 | 39.2 | 42.6 | 39.7 | 38.4 | 37.4 | 37.7 |
| Average transmittance [%] at 700 nm to 1200 nm | 1.9 | 1.9 | 2.6 | 1.9 | 1.8 | 1.7 | 1.8 |
| Average transmittance [%] at 430 nm to 550 nm | 88.0 | 88.1 | 88.9 | 87.7 | 87.7 | 88.0 | 88.1 |
| Average transmittance [%] at 800 nm to 950 nm | 0.4 | 0.4 | 0.7 | 0.4 | 0.4 | 0.4 | 0.4 |
| Average transmittance [%] at 1000 nm to 1200 nm | 1.9 | 1.9 | 2.8 | 2.0 | 1.8 | 1.7 | 1.7 |
| Transmittance [%] at 430 nm | 86.0 | 86.1 | 87.1 | 85.5 | 85.7 | 85.9 | 86.1 |
| Transmittance [%] at 1000 nm | 0.6 | 0.6 | 1.0 | 0.6 | 0.6 | 0.5 | 0.5 |
| IR50 [nm] | 630 | 630 | 634 | 628 | 630 | 630 | 630 |

|  | Example 83 | Example 84 | Example 85 | Example 86 | Example 87 | Example 88 | Example 89 | Example 90 |
|---|---|---|---|---|---|---|---|---|
| $P_2O_5$ | 68.37 | 66.88 | 68.28 | 67.53 | 66.79 | 66.06 | 68.29 | 67.84 |
| $Al_2O_3$ | 11.30 | 11.05 | 11.28 | 11.16 | 11.04 | 10.92 | 11.28 | 11.21 |
| $Li_2O$ | 0.00 | 0.00 | 0.00 | 0.00 | 0.00 | 0.00 | 0.00 | 0.00 |
| $Na_2O$ | 2.13 | 2.08 | 1.87 | 1.85 | 1.83 | 1.81 | 3.14 | 3.12 |
| $K_2O$ | 10.56 | 10.33 | 10.93 | 10.81 | 10.70 | 10.58 | 9.00 | 8.95 |
| $Rb_2O$ | 0.00 | 0.00 | 0.00 | 0.00 | 0.00 | 0.00 | 0.00 | 0.00 |
| $Cs_2O$ | 0.00 | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 |
| BaO | 0.0 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 |
| $Nb_2O_5$ | 0.00 | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 | 0.00 |
| CuO | 7.64 | 7.47 | 7.63 | 7.54 | 7.46 | 7.38 | 8.28 | 8.88 |
| $Ga_2O_3$ | 0.00 | 0.00 | 0.00 | 0.00 | 0.00 | 0.00 | 0.00 | 0.00 |
| F | 0.00 | 2.19 | 0.00 | 1.11 | 2.19 | 3.25 | 0.00 | 0.00 |
| Total | 100 | 100 | 100 | 100 | 100 | 100 | 100 | 100 |
| $\Sigma R_2O$ | 12.69 | 12.41 | 12.81 | 12.67 | 12.53 | 12.39 | 12.15 | 12.07 |
| $\Sigma R'O$ | 0.00 | 0.00 | 0.00 | 0.00 | 0.00 | 0.00 | 0.00 | 0.00 |
| Transmittance [%] at 1550 nm | 37.0 | 38.7 | 37.3 | 38.3 | 37.1 | 36.6 | 35.4 | 32.9 |

TABLE 6-continued

| | | | | | | | | |
|---|---|---|---|---|---|---|---|---|
| Average transmittance [%] at 700 nm to 1200 nm | 1.6 | 1.8 | 1.8 | 1.9 | 1.7 | 1.6 | 1.3 | 1.0 |
| Average transmittance [%] at 430 nm to 550 nm | 87.8 | 87.8 | 88.3 | 88.4 | 88.0 | 87.6 | 87.2 | 86.6 |
| Average transmittance [%] at 800 nm to 950 nm | 0.4 | 0.4 | 0.4 | 0.5 | 0.4 | 0.3 | 0.2 | 0.2 |
| Average transmittance [%] at 1000 nm to 1200 nm | 1.6 | 1.8 | 1.7 | 1.8 | 1.6 | 1.5 | 1.3 | 0.9 |
| Transmittance [%] at 430 nm | 85.6 | 85.6 | 86.1 | 86.3 | 85.7 | 85.2 | 84.7 | 83.6 |
| Transmittance [%] at 1000 nm | 0.5 | 0.6 | 0.5 | 0.6 | 0.5 | 0.4 | 0.4 | 0.2 |
| IR50 [nm] | 628 | 630 | 632 | 632 | 630 | 628 | 624 | 620 |

TABLE 7

| | Example 91 | Example 92 | Example 93 | Example 94 | Example 95 | Example 96 | Example 97 |
|---|---|---|---|---|---|---|---|
| $P_2O_5$ | 67.41 | 68.00 | 68.41 | 68.83 | 68.99 | 67.58 | 67.76 |
| $Al_2O_3$ | 11.14 | 11.24 | 11.30 | 11.37 | 11.40 | 11.17 | 11.20 |
| $Li_2O$ | 0.00 | 0.00 | 0.00 | 0.00 | 0.00 | 0.00 | 0.00 |
| $Na_2O$ | 3.10 | 3.13 | 3.15 | 3.17 | 3.17 | 3.61 | 4.13 |
| $K_2O$ | 8.89 | 6.29 | 6.33 | 6.37 | 6.76 | 8.15 | 7.40 |
| $Rb_2O$ | 0.00 | 0.00 | 0.00 | 0.00 | 0.00 | 0.00 | 0.00 |
| $Cs_2O$ | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 |
| BaO | 0.00 | 3.10 | 1.86 | 0.60 | 0.00 | 0.00 | 0.00 |
| ZnO | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 |
| $Nb_2O_5$ | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 |
| CuO | 9.46 | 8.25 | 8.95 | 9.66 | 9.68 | 9.49 | 9.51 |
| $Ga_2O_3$ | 0.00 | 0.00 | 0.00 | 0.00 | 0.00 | 0.00 | 0.00 |
| F | 0.00 | 0.00 | 0.00 | 0.00 | 0.00 | 0.00 | 0.00 |
| Total | 100 | 100 | 100 | 100 | 100 | 100 | 100 |
| $\Sigma R_2O$ | 11.99 | 9.42 | 9.48 | 9.54 | 9.93 | 11.76 | 11.53 |
| $\Sigma R'O$ | 0.00 | 3.10 | 1.86 | 0.60 | 0.00 | 0.00 | 0.00 |
| Transmittance [%] at 1550 nm | 31.2 | 34.9 | 32.5 | 30.4 | 29.0 | 31.1 | 30.7 |
| Average transmittance [%] at 700 nm to 1200 nm | 0.8 | 1.2 | 0.9 | 0.7 | 0.7 | 0.7 | 0.7 |
| Average transmittance [%] at 430 nm to 550 nm | 85.3 | 87.0 | 86.6 | 86.2 | 85.7 | 85.7 | 86.0 |
| Average transmittance [%] at 800 nm to 950 nm | 0.1 | 0.2 | 0.2 | 0.1 | 0.1 | 0.1 | 0.1 |
| Average transmittance [%] at 1000 nm to 1200 nm | 0.8 | 1.3 | 1.0 | 0.7 | 0.6 | 0.7 | 0.7 |
| Transmittance [%] at 430 nm | 81.6 | 84.5 | 83.9 | 83.2 | 82.4 | 82.2 | 82.7 |
| Transmittance [%] at 1000 nm | 0.2 | 0.3 | 0.2 | 0.2 | 0.1 | 0.2 | 0.2 |
| IR50 [nm] | 616 | 622 | 620 | 618 | 616 | 616 | 618 |

| | Example 98 | Example 99 | Example 100 | Example 101 | Example 102 | Example 103 | Example 104 | Example 105 |
|---|---|---|---|---|---|---|---|---|
| $P_2O_5$ | 67.69 | 67.97 | 69.08 | 69.17 | 69.26 | 69.36 | 69.45 | 69.54 |
| $Al_2O_3$ | 10.77 | 10.40 | 11.42 | 11.43 | 11.45 | 11.46 | 11.48 | 11.49 |
| $Li_2O$ | 0.00 | 0.00 | 0.00 | 0.00 | 0.00 | 0.00 | 0.00 | 0.00 |
| $Na_2O$ | 3.12 | 3.13 | 3.44 | 3.70 | 3.96 | 4.22 | 4.49 | 4.75 |
| $K_2O$ | 8.93 | 8.96 | 6.37 | 5.99 | 5.61 | 5.22 | 4.84 | 4.45 |

TABLE 7-continued

| | | | | | | | | |
|---|---|---|---|---|---|---|---|---|
| Rb$_2$O | 0.00 | 0.00 | 0.00 | 0.00 | 0.00 | 0.00 | 0.00 | 0.00 |
| Cs$_2$O | 0.00 | 0.00 | 0.00 | 0.00 | 0.00 | 0.00 | 0.00 | 0.00 |
| B$_2$O$_3$ | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 |
| SnO$_2$ | 0.00 | 0.00 | 0.00 | 0.00 | 0.00 | 0.00 | 0.00 | 0.00 |
| TiO$_2$ | 0.00 | 0.00 | 0.00 | 0.00 | 0.00 | 0.00 | 0.00 | 0.00 |
| WO$_3$ | 0.00 | 0.00 | 0.00 | 0.00 | 0.00 | 0.00 | 0.00 | 0.00 |
| Y$_2$O$_3$ | 0.00 | 0.00 | 0.00 | 0.00 | 0.00 | 0.00 | 0.00 | 0.00 |
| La$_2$O$_3$ | 0.00 | 0.00 | 0.00 | 0.00 | 0.00 | 0.00 | 0.00 | 0.00 |
| Nb$_2$O$_5$ | 0.00 | 0.00 | 0.00 | 0.00 | 0.00 | 0.00 | 0.00 | 0.00 |
| CeO$_2$ | 0.00 | 0.00 | 0.00 | 0.00 | 0.00 | 0.00 | 0.00 | 0.00 |
| CuO | 9.50 | 9.54 | 9.70 | 9.71 | 9.72 | 9.74 | 9.75 | 9.76 |
| Ga$_2$O$_3$ | 0.00 | 0.00 | 0.00 | 0.00 | 0.00 | 0.00 | 0.00 | 0.00 |
| F | 0.00 | 0.00 | 0.00 | 0.00 | 0.00 | 0.00 | 0.00 | 0.00 |
| Total | 100 | 100 | 100 | 100 | 100 | 100 | 100 | 100 |
| ΣR$_2$O | 12.04 | 12.09 | 9.81 | 9.69 | 9.57 | 9.45 | 9.33 | 9.20 |
| ΣR'O | 0.00 | 0.00 | 0.00 | 0.00 | 0.00 | 0.00 | 0.00 | 0.00 |
| Transmittance [%] at 1550 nm | 31.6 | 30.6 | 31.4 | 29.8 | 29.6 | 30.1 | 30.2 | 31.4 |
| Average transmittance [%] at 700 nm to 1200 nm | 0.7 | 0.8 | 0.9 | 0.7 | 0.7 | 0.7 | 0.7 | 0.8 |
| Average transmittance [%] at 430 nm to 550 nm | 85.8 | 86.2 | 86.4 | 86.0 | 85.8 | 86.1 | 86.2 | 86.4 |
| Average transmittance [%] at 800 nm to 950 nm | 0.1 | 0.1 | 0.1 | 0.1 | 0.1 | 0.1 | 0.1 | 0.1 |
| Average transmittance [%] at 1000 nm to 1200 nm | 0.8 | 0.7 | 0.8 | 0.7 | 0.7 | 0.7 | 0.7 | 0.8 |
| Transmittance [%] at 430 nm | 82.3 | 83.0 | 83.5 | 82.8 | 82.5 | 82.8 | 83.1 | 83.2 |
| Transmittance [%] at 1000 nm | 0.2 | 0.1 | 0.2 | 0.1 | 0.1 | 0.2 | 0.2 | 0.2 |
| IR50 [nm] | 616 | 620 | 620 | 616 | 616 | 616 | 616 | 618 |

TABLE 8

| | Example 106 | Example 107 | Example 108 | Example 109 | Example 110 | Example 111 | Example 112 |
|---|---|---|---|---|---|---|---|
| P$_2$O$_5$ | 69.64 | 69.73 | 69.56 | 67.69 | 69.69 | 69.23 | 68.45 |
| Al$_2$O$_3$ | 11.51 | 11.52 | 11.50 | 10.77 | 11.52 | 11.44 | 11.73 |
| Li$_2$O | 0.00 | 0.00 | 0.00 | 0.00 | 0.00 | 0.00 | 0.00 |
| Na$_2$O | 5.02 | 5.28 | 5.52 | 3.12 | 2.99 | 3.07 | 3.15 |
| K$_2$O | 4.06 | 3.67 | 5.65 | 8.93 | 8.56 | 8.80 | 9.03 |
| Rb$_2$O | 0.00 | 0.00 | 0.00 | 0.00 | 0.00 | 0.00 | 0.00 |
| Cs$_2$O | 0.00 | 0.00 | 0.00 | 0.00 | 0.00 | 0.00 | 0.00 |
| B$_2$O$_3$ | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 |
| SnO$_2$ | 0.00 | 0.00 | 0.00 | 0.00 | 0.00 | 0.00 | 0.00 |
| TiO$_2$ | 0.00 | 0.00 | 0.00 | 0.00 | 0.00 | 0.00 | 0.00 |
| WO$_3$ | 0.00 | 0.00 | 0.00 | 0.00 | 0.00 | 0.00 | 0.00 |
| Y$_2$O$_3$ | 0.00 | 0.00 | 0.00 | 0.00 | 0.00 | 0.00 | 0.00 |
| La$_2$O$_3$ | 0.00 | 0.00 | 0.00 | 0.00 | 0.00 | 0.00 | 0.00 |
| Nb$_2$O$_5$ | 0.00 | 0.00 | 0.00 | 0.00 | 0.00 | 0.00 | 0.00 |
| CeO$_2$ | 0.00 | 0.00 | 0.00 | 0.00 | 0.00 | 0.00 | 0.00 |
| CuO | 9.77 | 9.79 | 7.77 | 9.50 | 7.25 | 7.46 | 7.65 |
| Ga$_2$O$_3$ | 0.00 | 0.00 | 0.00 | 0.00 | 0.00 | 0.00 | 0.00 |
| F | 0.00 | 0.00 | 0.00 | 0.00 | 0.00 | 0.00 | 0.00 |
| Total | 100 | 100 | 100 | 100 | 100 | 100 | 100 |
| ΣR$_2$O | 9.08 | 8.96 | 11.17 | 12.04 | 11.54 | 11.88 | 12.18 |
| ΣR'O | 0.00 | 0.00 | 0.00 | 0.00 | 0.00 | 0.00 | 0.00 |
| Transmittance [%] at 1550 nm | 30.3 | 30.7 | 38.5 | 30.9 | 40.5 | 38.8 | 38.7 |

TABLE 8-continued

|  |  |  |  |  |  |  |  |
|---|---|---|---|---|---|---|---|
| Average transmittance [%] at 700 nm to 1200 nm | 0.7 | 0.7 | 1.7 | 0.7 | 2.4 | 2.0 | 1.8 |
| Average transmittance [%] at 430 nm to 550 nm | 86.2 | 86.2 | 88.4 | 86.1 | 89.1 | 88.4 | 88.1 |
| Average transmittance [%] at 800 nm to 950 nm | 0.1 | 0.1 | 0.4 | 0.1 | 0.6 | 0.5 | 0.4 |
| Average transmittance [%] at 1000 nm to 1200 nm | 0.7 | 0.8 | 1.8 | 0.7 | 2.3 | 1.9 | 1.9 |
| Transmittance [%] at 430 nm | 83.1 | 83.1 | 86.5 | 82.8 | 87.7 | 86.6 | 86.1 |
| Transmittance [%] at 1000 nm | 0.2 | 0.2 | 0.5 | 0.2 | 0.8 | 0.6 | 0.6 |
| IR50 [nm] | 616 | 616 | 628 | 618 | 638 | 634 | 628 |

|  | Example 113 | Example 114 | Example 115 | Example 116 | Example 117 | Example 118 | Example 119 | Example 120 |
|---|---|---|---|---|---|---|---|---|
| $P_2O_5$ | 68.36 | 67.98 | 68.26 | 68.73 | 68.73 | 69.03 | 68.80 | 69.07 |
| $Al_2O_3$ | 11.49 | 11.63 | 11.28 | 11.36 | 11.36 | 11.4 | 11.37 | 11.41 |
| $Li_2O$ | 0.00 | 0.00 | 0.00 | 0.00 | 0.00 | 0.00 | 0.00 | 0.00 |
| $Na_2O$ | 3.20 | 3.24 | 3.25 | 3.16 | 3.16 | 3.18 | 3.17 | 3.18 |
| $K_2O$ | 9.17 | 9.28 | 9.32 | 9.06 | 9.06 | 6.39 | 6.37 | 6.00 |
| $Rb_2O$ | 0.00 | 0.00 | 0.00 | 0.00 | 0.00 | 0.00 | 0.00 | 0.00 |
| $Cs_2O$ | 0.00 | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 |
| $Nb_2O_5$ | 0.00 | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 | 0.00 |
| CuO | 7.77 | 7.86 | 7.89 | 7.68 | 7.68 | 10.00 | 10.30 | 10.34 |
| $Ga_2O_3$ | 0.00 | 0.00 | 0.00 | 0.00 | 0.00 | 0.00 | 0.00 | 0.00 |
| F | 0.00 | 0.00 | 0.00 | 0.00 | 0.00 | 0.00 | 0.00 | 0.00 |
| Total | 100 | 100 | 100 | 100 | 100 | 100 | 100 | 100 |
| $\Sigma R_2O$ | 12.37 | 12.52 | 12.57 | 12.23 | 12.23 | 9.57 | 9.54 | 9.18 |
| $\Sigma R'O$ | 0.00 | 0.00 | 0.00 | 0.00 | 0.00 | 0.00 | 0.00 | 0.00 |
| Transmittance [%] at 1550 nm | 37.7 | 36.8 | 37.4 | 38.4 | 38.5 | 28.4 | 28.6 | 26.9 |
| Average transmittance [%] at 700 nm to 1200 nm | 1.7 | 1.4 | 1.6 | 1.8 | 1.7 | 0.6 | 0.6 | 0.5 |
| Average transmittance [%] at 430 nm to 550 nm | 87.8 | 87.7 | 88.1 | 88.1 | 88.1 | 85.7 | 85.6 | 85.4 |
| Average transmittance [%] at 800 nm to 950 nm | 0.4 | 0.3 | 0.4 | 0.4 | 0.4 | 0.1 | 0.1 | 0.1 |
| Average transmittance [%] at 1000 nm to 1200 nm | 1.7 | 1.5 | 1.6 | 1.8 | 1.8 | 0.6 | 0.6 | 0.5 |
| Transmittance [%] at 430 nm | 85.7 | 85.4 | 86.0 | 86.1 | 86.0 | 82.4 | 82.3 | 82.0 |
| Transmittance [%] at 1000 nm | 0.5 | 0.4 | 0.5 | 0.6 | 0.6 | 0.1 | 0.1 | 0.1 |
| IR50 [nm] | 628 | 624 | 628 | 630 | 628 | 614 | 616 | 614 |

TABLE 9

|  | Example 121 | Example 122 | Example 123 | Example 124 | Example 125 | Example 126 | Example 127 |
|---|---|---|---|---|---|---|---|
| $P_2O_5$ | 68.97 | 69.09 | 68.64 | 68.55 | 68.81 | 68.90 | 68.72 |
| $Al_2O_3$ | 11.40 | 10.99 | 11.34 | 11.33 | 11.37 | 11.39 | 11.36 |
| $Li_2O$ | 0.00 | 0.00 | 0.00 | 0.00 | 0.00 | 0.00 | 0.00 |
| $Na_2O$ | 2.92 | 3.18 | 2.14 | 1.88 | 1.89 | 2.15 | 1.63 |

TABLE 9-continued

|  |  |  |  |  |  |  |  |
|---|---|---|---|---|---|---|---|
| $K_2O$ | 6.39 | 6.40 | 10.22 | 10.59 | 10.24 | 9.87 | 10.62 |
| $Rb_2O$ | 0.00 | 0.00 | 0.00 | 0.00 | 0.00 | 0.00 | 0.00 |
| $Cs_2O$ | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 |
| $Nb_2O_5$ | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 |
| CuO | 10.32 | 10.34 | 7.67 | 7.66 | 7.69 | 7.70 | 7.68 |
| $Ga_2O_3$ | 0.00 | 0.00 | 0.00 | 0.00 | 0.00 | 0.00 | 0.00 |
| F | 0.00 | 0.00 | 0.00 | 0.00 | 0.00 | 0.00 | 0.00 |
| Total | 100 | 100 | 100 | 100 | 100 | 100 | 100 |
| $\Sigma R_2O$ | 9.30 | 9.58 | 12.35 | 12.47 | 12.13 | 12.01 | 12.25 |
| $\Sigma R'O$ | 0.00 | 0.00 | 0.00 | 0.00 | 0.00 | 0.00 | 0.00 |
| Transmittance [%] at 1550 nm | 28.5 | 28.8 | 37.1 | 37.7 | 37.8 | 37.7 | 37.0 |
| Average transmittance [%] at 700 nm to 1200 nm | 0.6 | 0.6 | 1.7 | 1.8 | 1.9 | 1.9 | 1.8 |
| Average transmittance [%] at 430 nm to 550 nm | 85.7 | 86.1 | 88.6 | 88.6 | 88.2 | 88.9 | 88.5 |
| Average transmittance [%] at 800 nm to 950 nm | 0.1 | 0.1 | 0.4 | 0.4 | 0.5 | 0.4 | 0.4 |
| Average transmittance [%] at 1000 nm to 1200 nm | 0.6 | 0.6 | 1.6 | 1.7 | 1.8 | 1.7 | 1.6 |
| Transmittance [%] at 430 nm | 82.5 | 83.0 | 86.7 | 86.8 | 86.4 | 87.1 | 86.7 |
| Transmittance [%] at 1000 nm | 0.1 | 0.1 | 0.5 | 0.5 | 0.6 | 0.6 | 0.5 |
| IR50 [nm] | 614 | 616 | 632 | 632 | 632 | 634 | 632 |

|  | Example 128 | Example 129 | Example 130 | Example 131 | Example 132 | Example 133 | Example 134 | Example 135 |
|---|---|---|---|---|---|---|---|---|
| $P_2O_5$ | 69.26 | 69.17 | 68.41 | 68.90 | 68.14 | 68.94 | 68.99 | 69.08 |
| $Al_2O_3$ | 11.45 | 11.43 | 11.30 | 11.39 | 11.26 | 11.39 | 11.40 | 11.42 |
| $Li_2O$ | 0.00 | 0.00 | 0.00 | 0.00 | 0.00 | 0.00 | 0.00 | 0.00 |
| $Na_2O$ | 1.64 | 2.15 | 2.13 | 1.38 | 1.36 | 1.38 | 1.64 | 1.89 |
| $K_2O$ | 9.92 | 9.51 | 9.41 | 10.64 | 10.53 | 9.48 | 10.27 | 9.89 |
| $Rb_2O$ | 0.00 | 0.00 | 0.00 | 0.00 | 0.00 | 0.00 | 0.00 | 0.00 |
| $Cs_2O$ | 0.00 | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 |
| $Nb_2O_5$ | 0.00 | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 | 0.00 |
| CuO | 7.74 | 7.73 | 7.64 | 7.70 | 7.61 | 7.70 | 7.71 | 7.72 |
| $Ga_2O_3$ | 0.00 | 0.00 | 0.00 | 0.00 | 0.00 | 0.00 | 0.00 | 0.00 |
| F | 0.00 | 0.00 | 1.11 | 0.00 | 1.11 | 1.11 | 0.00 | 0.00 |
| Total | 100 | 100 | 100 | 100 | 100 | 100 | 100 | 100 |
| $\Sigma R_2O$ | 11.56 | 11.67 | 11.54 | 12.02 | 11.89 | 10.86 | 11.90 | 11.79 |
| $\Sigma R'O$ | 0.00 | 0.00 | 0.00 | 0.00 | 0.00 | 0.00 | 0.00 | 0.00 |
| Transmittance [%] at 1550 nm | 36.2 | 37.2 | 38.4 | 36.3 | 37.0 | 40.3 | 36.8 | 36.4 |
| Average transmittance [%] at 700 nm to 1200 nm | 1.8 | 1.8 | 1.9 | 1.8 | 1.8 | 2.7 | 1.8 | 1.7 |

TABLE 9-continued

| | | | | | | | | |
|---|---|---|---|---|---|---|---|---|
| Average transmittance [%] at 430 nm to 550 nm | 88.0 | 88.5 | 87.9 | 87.8 | 88.3 | 88.3 | 88.2 | 88.2 |
| Average transmittance [%] at 800 nm to 950 nm | 0.4 | 0.4 | 0.5 | 0.4 | 0.4 | 0.8 | 0.4 | 0.4 |
| Average transmittance [%] at 1000 nm to 1200 nm | 1.6 | 1.7 | 1.9 | 1.5 | 1.6 | 2.5 | 1.6 | 1.6 |
| Transmittance [%] at 430 nm | 86.1 | 86.7 | 85.9 | 85.9 | 86.4 | 86.7 | 86.4 | 86.5 |
| Transmittance [%] at 1000 nm | 0.5 | 0.5 | 0.6 | 0.5 | 0.5 | 0.9 | 0.5 | 0.5 |
| IR50 [nm] | 632 | 632 | 632 | 632 | 632 | 640 | 632 | 632 |

TABLE 10

| | Example 136 | Example 137 | Example 138 | Example 139 | Example 140 | Example 141 | Example 142 | Example 143 | Example 144 | Example 145 |
|---|---|---|---|---|---|---|---|---|---|---|
| $P_2O_5$ | 67.89 | 67.43 | 67.69 | 66.67 | 65.68 | 64.73 | 68.28 | 67.84 | 45.91 | 69.51 |
| $Al_2O_3$ | 10.39 | 9.49 | 11.19 | 11.02 | 10.85 | 10.70 | 11.28 | 11.21 | 7.54 | 13.02 |
| $Li_2O$ | 0.00 | 0.00 | 0.00 | 0.00 | 0.00 | 0.00 | 0.00 | 0.00 | 5.93 | 0.62 |
| $Na_2O$ | 2.11 | 2.10 | 3.12 | 3.07 | 3.02 | 2.98 | 3.14 | 3.12 | 0.00 | 1.29 |
| $K_2O$ | 10.49 | 10.42 | 8.16 | 7.28 | 6.43 | 5.61 | 9.00 | 8.95 | 0.00 | 1.30 |
| $Rb_2O$ | 0.00 | 0.00 | 0.00 | 0.00 | 0.00 | 0.00 | 0.00 | 0.00 | 0.00 | 0.00 |
| $Cs_2O$ | 0.00 | 0.00 | 2.29 | 4.51 | 6.67 | 8.76 | 0.00 | 0.00 | 0.00 | 0.00 |
| $B_2O_3$ | 0.00 | 0.00 | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 | 4.14 | 0.00 |
| SrO | 0.00 | 0.00 | 0.00 | 0.00 | 0.00 | 0.00 | 0.00 | 0.00 | 9.10 | 0.00 |
| MgO | 0.00 | 0.00 | 0.00 | 0.00 | 0.00 | 0.00 | 0.00 | 0.00 | 2.08 | 1.37 |
| BaO | 0.00 | 0.00 | 0.00 | 0.00 | 0.00 | 0.00 | 0.00 | 0.00 | 14.09 | 2.61 |
| ZnO | 0.00 | 0.00 | 0.00 | 0.00 | 0.00 | 0.00 | 0.00 | 0.00 | 0.00 | 4.85 |
| $SnO_2$ | 0.00 | 0.00 | 0.00 | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.65 | 1.30 | 0.00 | 0.00 |
| $WO_3$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 | 0.00 | 0.00 |
| $Nb_2O_5$ | 0.00 | 0.00 | 0.00 | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 | 0.00 | 0.00 | 0.00 |
| CuO | 7.59 | 7.53 | 7.56 | 7.45 | 7.34 | 7.23 | 7.63 | 7.58 | 3.70 | 5.42 |
| $Ga_2O_3$ | 1.53 | 3.03 | 0.00 | 0.00 | 0.00 | 0.00 | 0.00 | 0.00 | 0.00 | 0.00 |
| F | 0.00 | 0.00 | 0.00 | 0.00 | 0.00 | 0.00 | 0.00 | 0.00 | 7.51 | 0.00 |
| Total | 100 | 100 | 100 | 100 | 100 | 100 | 100 | 100 | 100 | 100 |
| $\Sigma R_2O$ | 12.60 | 12.52 | 13.57 | 14.86 | 16.12 | 17.35 | 12.15 | 12.07 | 5.93 | 3.21 |
| $\Sigma R'O$ | 0.00 | 0.00 | 0.00 | 0.00 | 0.00 | 0.00 | 0.00 | 0.00 | 29.41 | 8.84 |
| Transmittance [%] at 1550 nm | 38.5 | 39.8 | 38.6 | 38.2 | 37.4 | 38.5 | 37.8 | 37.5 | 68.2 | 56.6 |
| Average transmittance [%] at 700 nm to 1200 nm | 2.1 | 2.4 | 1.9 | 1.9 | 1.7 | 1.9 | 1.7 | 1.7 | 9.5 | 5.6 |
| Average transmittance [%] at 430 nm to 550 nm | 88.9 | 84.1 | 88.5 | 88.3 | 87.6 | 88.2 | 87.0 | 85.3 | 88.8 | 88.3 |
| Average transmittance [%] at 800 nm to 950 nm | 0.5 | 0.6 | 0.5 | 0.5 | 0.4 | 0.4 | 0.4 | 0.4 | 3.9 | 2.2 |
| Average transmittance [%] at 1000 nm to 1200 nm | 1.8 | 2.1 | 1.9 | 1.8 | 1.6 | 1.8 | 1.7 | 1.7 | 15.1 | 8.2 |
| Transmittance [%] at 430 nm | 87.1 | 77.9 | 86.7 | 86.5 | 85.5 | 86.3 | 84.1 | 81.6 | 87.7 | 86.6 |
| Transmittance [%] at 1000 nm | 0.6 | 0.8 | 0.6 | 0.6 | 0.5 | 0.6 | 0.5 | 0.5 | 7.7 | 3.6 |
| IR50 [nm] | 638 | 640 | 632 | 632 | 630 | 632 | 628 | 628 | 632 | 630 |

TABLE 11

| mass % | Example 146 | Example 147 | Example 148 | Example 149 | Example 150 |
|---|---|---|---|---|---|
| $P_2O_5$ | 73.53 | 72.67 | 72.14 | 71.31 | 68.83 |
| $Al_2O_3$ | 16.25 | 16.06 | 15.94 | 15.76 | 13.06 |
| $Li_2O$ | 0.00 | 0.00 | 0.00 | 0.00 | 0.00 |

TABLE 11-continued

|  |  |  |  |  |  |
|---|---|---|---|---|---|
| Na₂O | 3.70 | 3.66 | 0.00 | 0.00 | 3.68 |
| K₂O | 0.00 | 0.00 | 5.52 | 5.46 | 6.74 |
| Rb₂O | 0.00 | 0.00 | 0.00 | 0.00 | 0.00 |
| Cs₂O | 0.00 | 0.00 | 0.00 | 0.00 | 0.00 |
| B₂O₃ | 0.00 | 0.00 | 0.00 | 0.00 | 0.00 |
| CaO | 0.00 | 0.00 | 0.00 | 0.00 | 0.00 |
| SrO | 0.00 | 0.00 | 0.00 | 0.00 | 0.00 |
| MgO | 0.00 | 0.00 | 0.00 | 0.00 | 0.00 |
| BaO | 0.00 | 0.00 | 0.00 | 0.00 | 0.00 |
| ZnO | 0.00 | 0.00 | 0.00 | 0.00 | 0.00 |
| SnO₂ | 0.00 | 0.00 | 0.00 | 0.00 | 0.00 |
| TiO₂ | 0.00 | 0.00 | 0.00 | 0.00 | 0.00 |
| WO₃ | 0.00 | 0.00 | 0.00 | 0.00 | 0.00 |
| Y₂O₃ | 0.00 | 0.00 | 0.00 | 0.00 | 0.00 |
| La₂O₃ | 0.00 | 0.00 | 0.00 | 0.00 | 0.00 |
| Nb₂O₅ | 0.00 | 0.00 | 0.00 | 0.00 | 0.00 |
| CeO₂ | 0.00 | 0.00 | 0.00 | 0.00 | 0.00 |
| CuO | 6.52 | 7.61 | 6.40 | 7.47 | 7.69 |
| Ga₂O₃ | 0.00 | 0.00 | 0.00 | 0.00 | 0.00 |
| F | 0.00 | 0.00 | 0.00 | 0.00 | 0.00 |
| Total | 100 | 100 | 100 | 100 | 100 |
| ΣR₂O | 3.70 | 3.66 | 5.52 | 5.46 | 10.42 |
| ΣR'O | 0.00 | 0.00 | 0.00 | 0.00 | 0.00 |
| Transmittance [%] at 1550 nm | 38.5 | 38.6 | 37.9 | 33.3 | 38.5 |
| Average transmittance [%] at 700 nm to 1200 nm | 2.4 | 2.4 | 3.3 | 2.1 | 1.7 |
| Average transmittance [%] at 430 nm to 550 nm | 73.9 | 74.4 | 76.9 | 72.0 | 85.3 |
| Average transmittance [%] at 800 nm to 950 nm | 0.8 | 0.8 | 1.3 | 0.7 | 0.4 |
| Average transmittance [%] at 1000 nm to 1200 nm | 3.0 | 3.0 | 3.3 | 2.1 | 2.0 |
| Transmittance [%] at 430 nm | 62.5 | 63.4 | 67.6 | 60.2 | 81.3 |
| Transmittance [%] at 1000 nm | 1.1 | 1.1 | 1.4 | 0.8 | 0.6 |
| IR50 [nm] | 618 | 620 | 628 | 618 | 622 |

| mass % | Example 151 | Example 152 | Example 153 | Example 154 | Example 155 | Example 156 |
|---|---|---|---|---|---|---|
| P₂O₅ | 68.90 | 68.85 | 68.53 | 68.49 | 68.83 | 68.81 |
| Al₂O₃ | 13.07 | 13.91 | 13.00 | 13.83 | 14.32 | 14.74 |
| Li₂O | 0.00 | 0.00 | 0.00 | 0.00 | 0.00 | 0.00 |
| Na₂O | 3.17 | 3.17 | 2.13 | 2.13 | 3.17 | 3.17 |
| K₂O | 5.19 | 4.41 | 6.71 | 5.93 | 4.02 | 3.63 |
| Rb₂O | 0.00 | 0.00 | 0.00 | 0.00 | 0.00 | 0.00 |
| Cs₂O | 0.00 | 0.00 | 0.00 | 0.00 | 0.00 | 0.00 |
| B₂O₃ | 0.00 | 0.00 | 0.00 | 0.00 | 0.00 | 0.00 |
| CaO | 0.00 | 0.00 | 0.00 | 0.00 | 0.00 | 0.00 |
| SrO | 0.00 | 0.00 | 0.00 | 0.00 | 0.00 | 0.00 |
| MgO | 0.00 | 0.00 | 0.00 | 0.00 | 0.00 | 0.00 |
| BaO | 0.00 | 0.00 | 0.00 | 0.00 | 0.00 | 0.00 |
| ZnO | 0.00 | 0.00 | 0.00 | 0.00 | 0.00 | 0.00 |
| SnO₂ | 0.00 | 0.00 | 0.00 | 0.00 | 0.00 | 0.00 |
| TiO₂ | 0.00 | 0.00 | 0.00 | 0.00 | 0.00 | 0.00 |
| WO₃ | 0.00 | 0.00 | 0.00 | 0.00 | 0.00 | 0.00 |
| Y₂O₃ | 0.00 | 0.00 | 0.00 | 0.00 | 0.00 | 0.00 |
| La₂O₃ | 0.00 | 0.00 | 0.00 | 0.00 | 0.00 | 0.00 |
| Nb₂O₅ | 0.00 | 0.00 | 0.00 | 0.00 | 0.00 | 0.00 |
| CeO₂ | 0.00 | 0.00 | 0.00 | 0.00 | 0.00 | 0.00 |
| CuO | 9.67 | 9.66 | 9.62 | 9.61 | 9.66 | 9.66 |
| Ga₂O₃ | 0.00 | 0.00 | 0.0 | 0.00 | 0.00 | 0.00 |
| F | 0.00 | 0.00 | 0.00 | 0.00 | 0.00 | 0.00 |
| Total | 100 | 100 | 100 | 100 | 100 | 100 |
| ΣR₂O | 8.36 | 7.58 | 8.85 | 8.07 | 7.18 | 6.79 |
| ΣR'O | 0.00 | 0.00 | 0.00 | 0.00 | 0.00 | 0.00 |
| Transmittance [%] at 1550 nm | 28.7 | 29.6 | 29.1 | 29.3 | 28.7 | 28.1 |
| Average transmittance [%] at 700 nm to 1200 nm | 0.7 | 0.7 | 0.6 | 0.7 | 0.7 | 0.7 |
| Average transmittance [%] at 430 nm to 550 nm | 81.7 | 79.8 | 81.7 | 79.2 | 79.6 | 76.5 |
| Average transmittance [%] at 800 nm to 950 nm | 0.1 | 0.1 | 0.1 | 0.1 | 0.1 | 0.1 |

TABLE 11-continued

| | | | | | | |
|---|---|---|---|---|---|---|
| Average transmittance [%] at 1000 nm to 1200 nm | 0.7 | 0.8 | 0.7 | 0.8 | 0.8 | 0.8 |
| Transmittance [%] at 430 nm | 75.6 | 72.2 | 76.0 | 71.8 | 72.0 | 67.1 |
| Transmittance [%] at 1000 nm | 0.2 | 0.2 | 0.2 | 0.2 | 0.2 | 0.2 |
| IR50 [nm] | 610 | 610 | 608 | 606 | 610 | 608 |

In each of Inventive Examples (Examples 1 to 143 and Examples 146 to 156) of the present invention, the transmittance at a wavelength of 1550 nm was 25% or more, the average transmittance at a wavelength of 700 nm to 1200 nm was 5% or less, and the transmittance of light in the near-infrared region could be kept low while maintaining a high transmittance of light in the short wavelength infrared region.

On the other hand, in each of Comparative Examples (Examples 144 and 145), the transmittance at a wavelength of 1550 nm was 25% or more, and the average transmittance at a wavelength of 700 nm to 1200 nm was more than 5%, and the transmittance of light in the near-infrared region could not be kept low.

As can be seen from the transmittances of a light having a wavelength of 300 to 2500 nm in Example 26 (Inventive Example) and Example 144 (Comparative Example) shown in the FIGURE, in Example 26, the transmittance of a light in the near-infrared region (wavelength 700 nm to 1200 nm) can be kept low while maintaining a high transmittance of a light in the visible light region (wavelength 430 nm to 550 nm), and a high transmittance of a light in the short wavelength infrared region (wavelength more than 1200 nm to 1600 nm) can also be maintained. On the other hand, in Example 144, the transmittance of a light in the near-infrared region (wavelength 700 nm to 1200 nm) cannot be kept low.

Next, the weather resistance of the glass in Examples was determined based on the presence or absence of a change in appearance after maintaining the glass under an atmosphere condition of a temperature of 85° C. and a relative humidity of 85% for 100 hours. Specifically, a sample in which a degree of deterioration of the glass surface was small after the test was evaluated as "A", and a sample in which the degree of deterioration was large due to elution of the glass component to the surface and dripping or the like was evaluated as "B".

As a result, the weather resistance in Example 4 of the present invention was evaluated as "B", and the weather resistance in each of Examples 12, 15, 24, and 26 was evaluated as "A", and the weather resistance in each of Examples 12, 15, 24, and 26 exhibited weather resistance higher than that in Example 4.

Although various embodiments have been described above with reference to the drawings, it is needless to say that the present invention is not limited to such examples. It is obvious for a person skilled in the art that various modifications and variations can be made within the category described in the scope of claims and it is understood that such modifications and variations naturally belong to the technical scope of the present invention. Further, the components described in the above embodiment may be combined in any manner without departing from the gist of the invention.

Note that the present application is based on Japanese Patent Application No. 2022-056647 filed on Mar. 30, 2022, contents of which are incorporated herein by reference.

What is claimed is:

1. A glass for an optical filter, the glass being a phosphate glass comprising Cu, wherein
the glass has:
an average transmittance of 80% or more at a wavelength of 430 nm to 550 nm;
an average transmittance of 2% or less at a wavelength of 800 nm to 950 nm;
an average transmittance of 3% or less at a wavelength of 1000 nm to 1200 nm;
an average transmittance of 5% or less at a wavelength of 700 nm to 1200 nm;
a transmittance of 25% or more at a wavelength of 1550 nm; and
a wavelength at which a transmittance is 50% of 615 nm or more in a wavelength range of 600 nm to 800 nm.

2. The glass for an optical filter according to claim 1, comprising, in terms of mass % based on oxide:
$P_2O_5$: 50% to 80%;
$Al_2O_3$: 5% to 20%;
$\Sigma R_2O$: 0.5% to 20% where $R_2O$ is one or more components selected from $Li_2O$, $Na_2O$, $K_2O$, $Rb_2O$, and $Cs_2O$, and $\Sigma R_2O$ is a total content of $R_2O$;
$\Sigma R'O$: 0% to 15% where R'O is one or more components selected from CaO, MgO, BaO, SrO, and ZnO, and $\Sigma R'O$ is a total content of R'O; and
CuO: 4% to 20%.

3. The glass for an optical filter according to claim 2, further comprising more than 7% of CuO in terms of mass % based on oxide.

4. The glass for an optical filter according to claim 2, further comprising 60% to 75% of $P_2O_5$ in terms of mass % based on oxide.

5. The glass for an optical filter according to claim 2, further comprising 9% to 16.5% of $Al_2O_3$ in terms of mass % based on oxide.

6. The glass for an optical filter according to claim 2, being substantially free from BaO.

7. The glass for an optical filter according to claim 2, being substantially free from a divalent cation other than Cu.

8. The glass for an optical filter according to claim 2, further comprising more than 7% and 18% or less of $\Sigma R_2O$ where $R_2O$ is one or more components selected from $Li_2O$, $Na_2O$, $K_2O$, $Rb_2O$, and $Cs_2O$, and $\Sigma R_2O$ is a total content of $R_2O$.

9. The glass for an optical filter according to claim 2, further comprising two or more components selected from $Li_2O$, $Na_2O$, $K_2O$, $Rb_2O$, and $Cs_2O$.

10. The glass for an optical filter according to claim 2, being substantially free from $Li_2O$.

11. The glass for an optical filter according to claim 2, being substantially free from $B_2O_3$.

12. The glass for an optical filter according to claim 2, being substantially free from F.

13. An optical filter, comprising the glass for an optical filter according to claim 1.

14. A solid-state image sensor, comprising the glass for an optical filter according to claim 1.

* * * * *